July 22, 1947.   J. L. ERISMAN   2,424,228
APPARATUS FOR DRYING, HEATING, AND/OR COOLING FLOWABLE SOLIDS
Filed Jan. 14, 1944   14 Sheets-Sheet 1

Inventor
John L. Erisman
By L. Donald Myers
Attorney

July 22, 1947.   J. L. ERISMAN   2,424,228
APPARATUS FOR DRYING, HEATING, AND/OR COOLING FLOWABLE SOLIDS
Filed Jan. 14, 1944   14 Sheets-Sheet 4

Inventor
John L. Erisman
By L. Donald Myers
Attorney

July 22, 1947.    J. L. ERISMAN    2,424,228
APPARATUS FOR DRYING, HEATING, AND/OR COOLING FLOWABLE SOLIDS
Filed Jan. 14, 1944    14 Sheets-Sheet 6

Inventor
John L. Erisman
By L. Donald Myers
Attorney

Inventor
John L. Erisman
By L. Donald Myers
Attorney

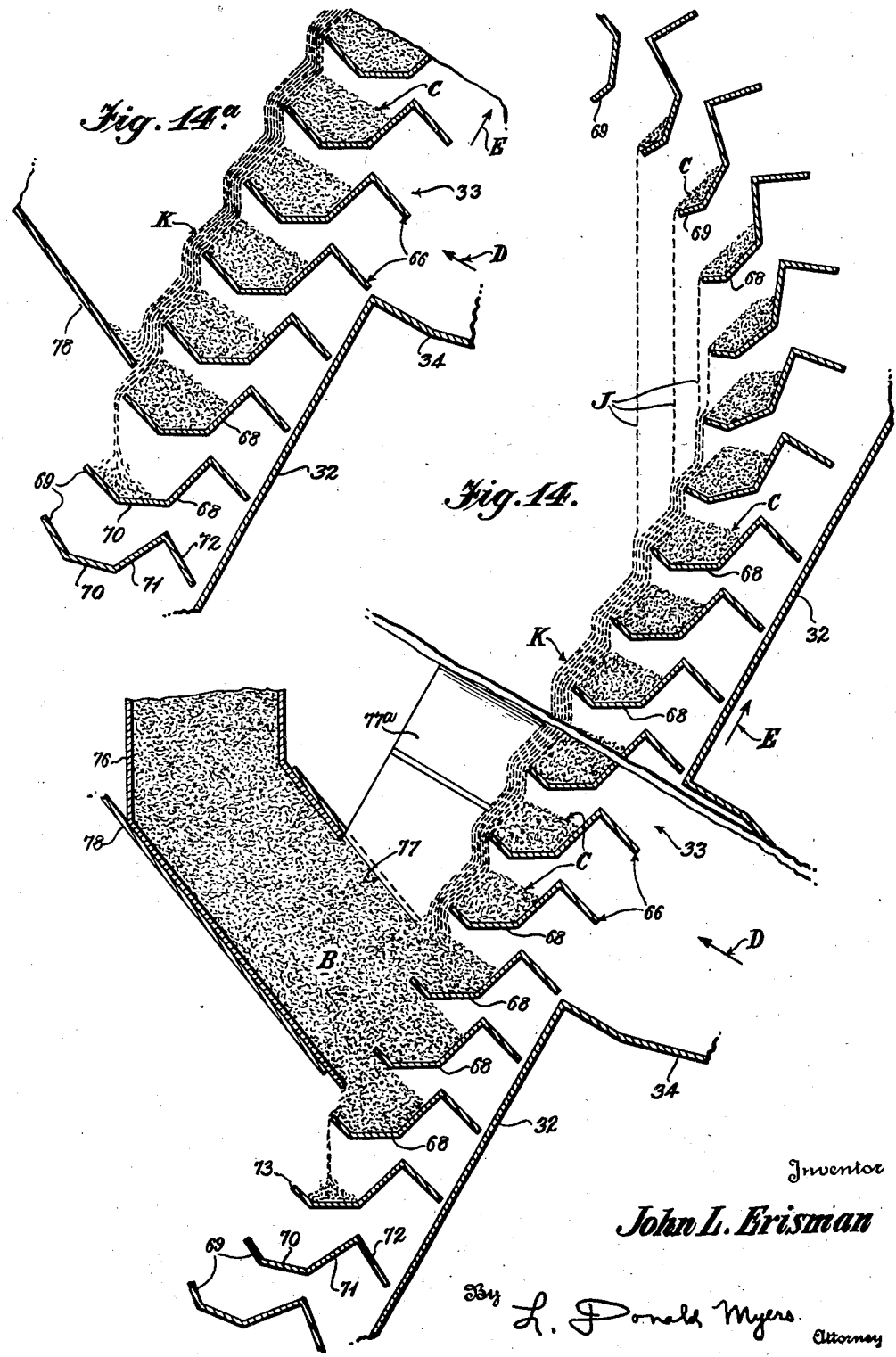

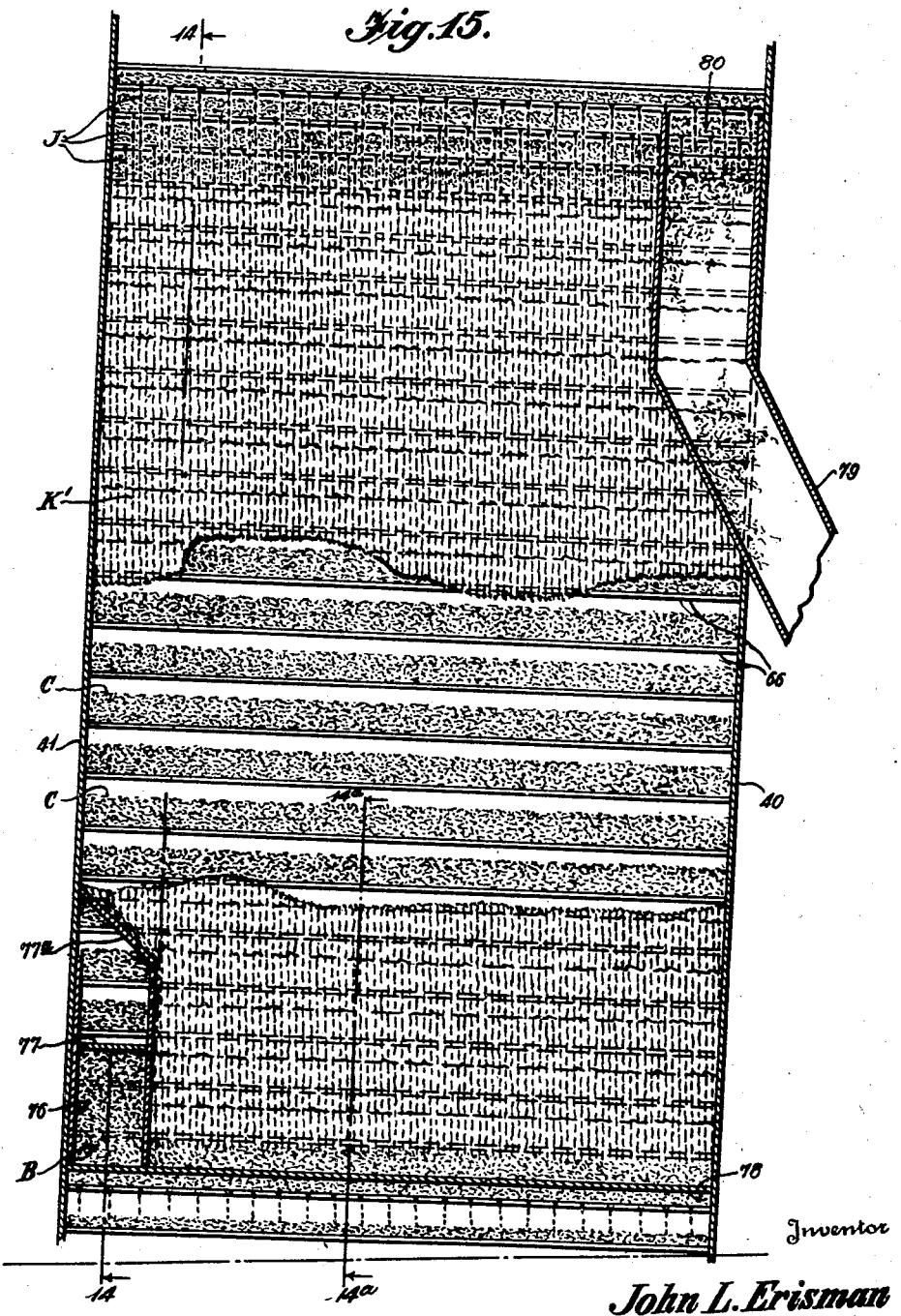

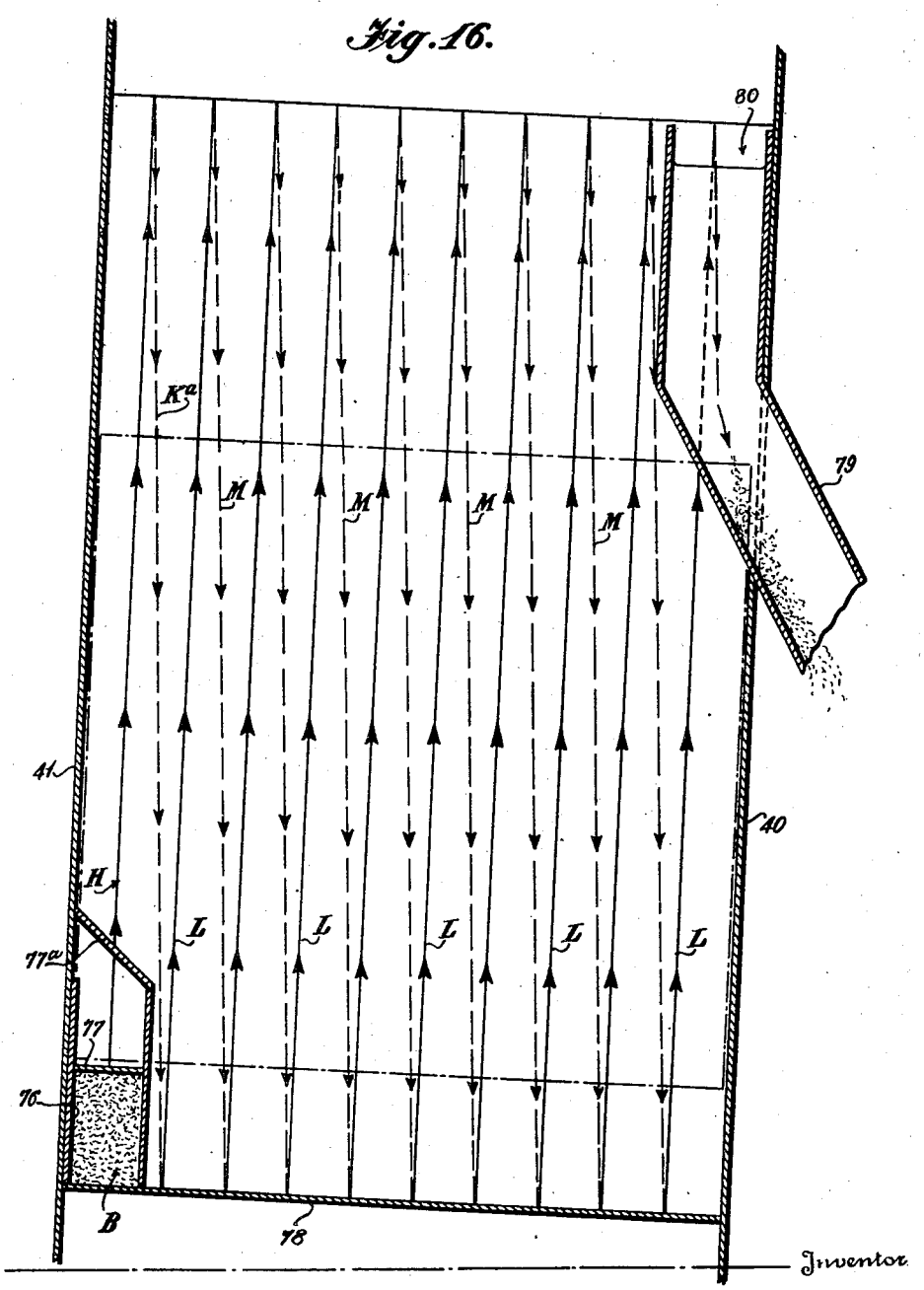

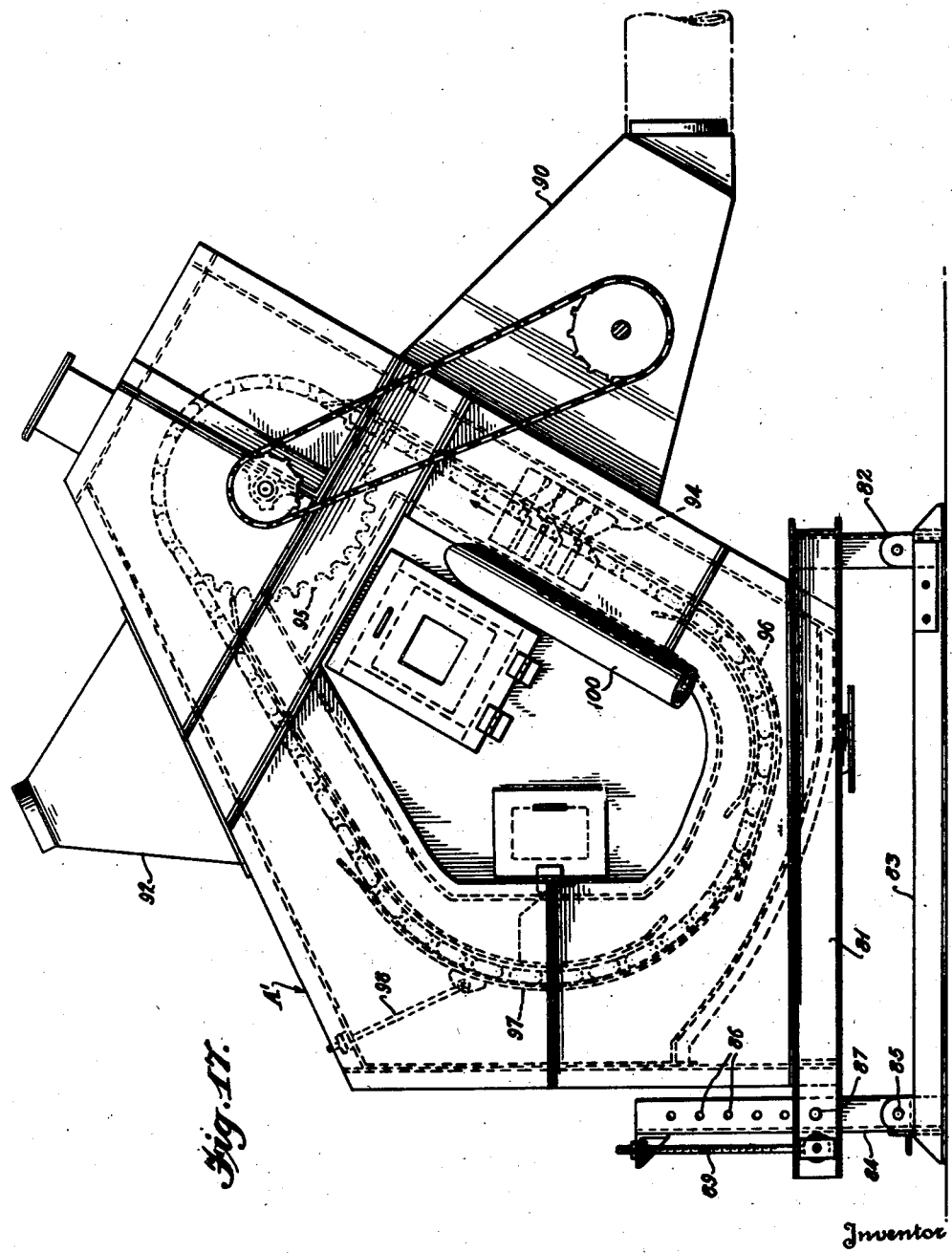

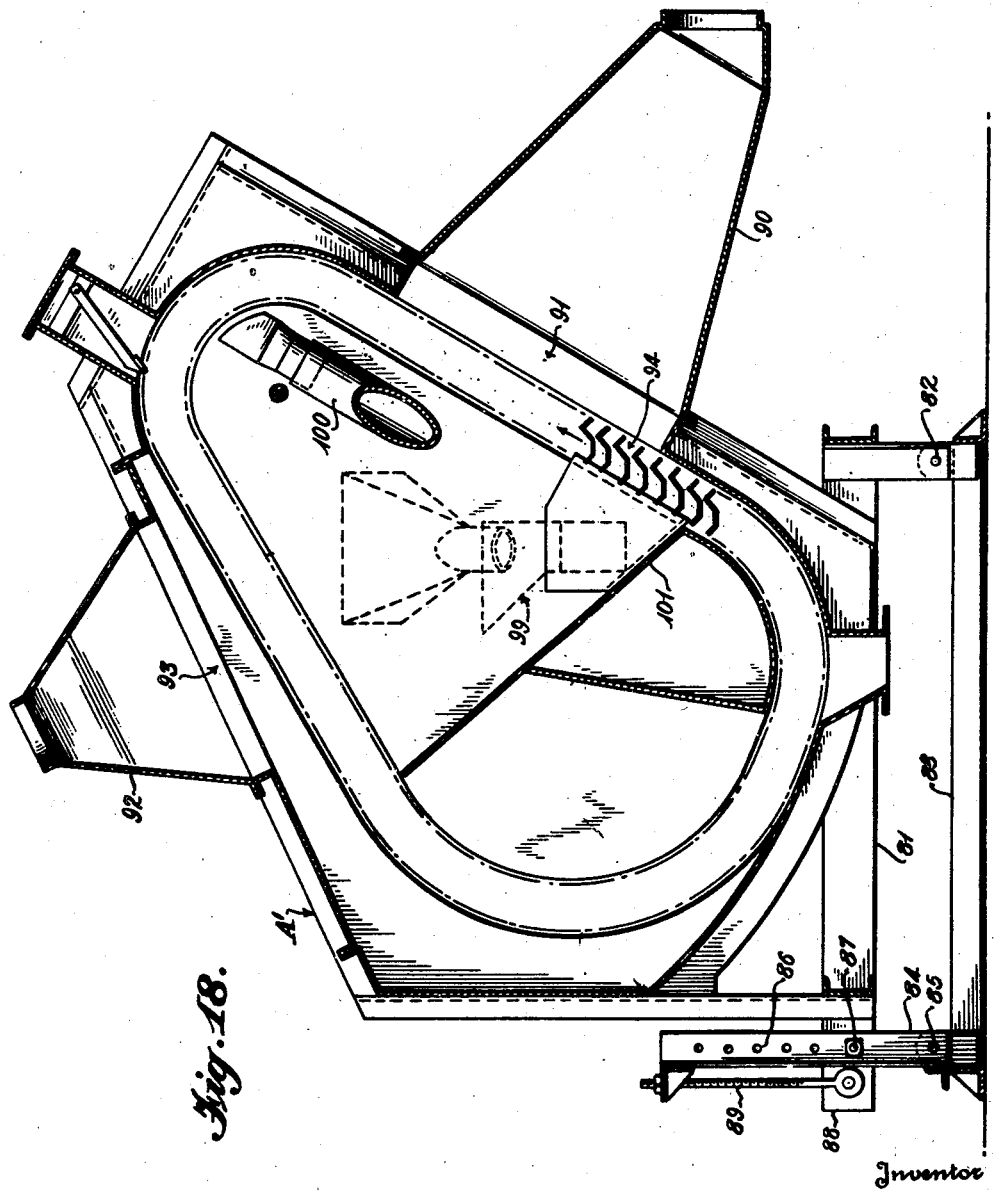

UNITED STATES PATENT OFFICE 2,424,228

APPARATUS FOR DRYING, HEATING, AND/OR COOLING FLOWABLE SOLIDS

John L. Erisman, Oak Park, Ill., assignor to Link-Belt Company, a corporation of Illinois Application January 14, 1944, Serial No. 518,303

25 Claims. (Cl. 34—102)

This invention relates to new and useful improvements in apparatus for treating flowable solids, and deals more particularly with the continuous treatment of flowable solids with air, or other gaseous fluids, to effect drying, heating and/or cooling thereof.

It is the present commercial practice to make extensive use of rotary drums, kilns, or the like, for continuously treating flowable solids with air, or other gaseous fluids, to remove therefrom moisture existing upon or within the individual material particles or lumps; to raise or lower the temperature of the material subsequent to or in preparation for some other treatment operation, or to effect other changes in physical characteristics. The use of certain types of rotary drums or kilns for this character of work is satisfactory insofar as efficiency of treatment of the material is concerned. However, such factors as initial cost based on tonnage capacity; power required to rotate the massive cylinder or drum structure for lifting and advancing the entire mass or load of material being treated and to force the treatment air, or other gaseous fluid, through the thick bed of material as it is advanced through the cylinder or drum; cost of making repairs or replacements of internal parts damaged or destroyed by the handling of highly abrasive or corrosive materials; and limitations regarding flexibility and adaptability of any given size of cylinder or drum for effecting proper treatment of materials of widely different sizes or moisture content, or requiring treatment periods of vastly different durations, make it impractical or impossible to employ this type of equipment for certain jobs.

The present invention provides apparatus which is fully as effective and efficient for the continuous treatment of flowable solids with air, or other gaseous fluids, to effect drying, heating and/or cooling thereof as rotary drums, kilns, or the like, and yet it overcomes all of the aforementioned undesirable factors or characteristics of such prior equipment.

It is the primary object of this invention to provide apparatus for subjecting flowable solids to the action of air, or other gaseous fluids, to effect such continuous treatment as removing moisture existing upon or within the individual material particles or lumps, merely raising or lowering the temperature of the material, or effecting other changes in physical characteristics.

A further important object of the invention is to provide apparatus for effecting continuous drying, heating and/or cooling of flowable solids by causing the solids to make repeated passes through the flow path of the treatment fluid during movement of the solids through the apparatus.

Still another primary object of the invention is to provide apparatus which will cause flowable solids to repeatedly fall or cascade as a relatively shallow stream through, and be repeatedly lifted back through, the flow path of treatment air, or other gaseous fluid, to effect a change in temperature and/or moisture content of the solids.

Another important object of the invention is to provide apparatus which will cause a treatment fluid to flow over the surfaces of spaced masses of flowable solids continuously moving in one direction and through a relatively shallow stream of said solids continuously moving in another direction to effect transfer of heat and/or moisture from one to the other of said materials.

A further object of the invention is the provision of apparatus for continuously drying, heating and/or cooling flowable solids which, as compared with such other prior equipment as rotary drums, kilns, or the like, may be manufactured at a lower cost because the primary parts of the apparatus only consist of a light-weight, stationary, fabricated housing and a fabricated pan or apron type of conveyor; may be operated with a small consumption of power for moving the material, by means of the said conveyor, into operative relation with the treatment gases because only approximately half of the flowable solids passing through the housing are at any given time being moved by the conveyor; may be maintained in good repair at small expense when employed for handling highly abrasive or corrosive materials because the pans or aprons of the conveyor are the only parts of the apparatus which are subject to severe attack by the abrasive or corrosive material being treated and the conveyor may be removed from the housing for convenient replacement; and may easily be conditioned for effectively treating materials of widely different sizes or moisture content or requiring treatment periods of vastly different duration because by inclining the conveyor at different angles with respect to the vertical and by transversely canting the conveyor with respect to the horizontal, the falling or cascading rate of movement of the material, the number of passes or cycles of movement of the material, and the progress of the material from the feeding point to the discharging point may be infinitely varied to provide treatment periods of vastly different duration, etc., for any given size of apparatus.

Another object of the invention is the provision of apparatus of the above mentioned type which, for any given tonnage capacity, will require a minimum quantity of the treatment fluid and a minimum consumption of power to effect flow of the treatment fluid because said fluid is only required to move or permeate through a thin or shallow layer of the material being treated and every particle or lump of the said material is repeatedly exposed to direct contact with the treatment fluid.

Other objects and advantages of the invention will be apparent during the course of the following description.

In the accompanying drawings forming a part of this specification and in which like numerals are employed to designate like parts throughout the same, Figure 1 is a side elevational view of one form of apparatus for effecting drying, heating and/or cooling of flowable solids that embodies this invention, Figure 2 is a longitudinal sectional view of the apparatus which is taken on line 2—2 of Fig. 1, Figure 3 is a longitudinal sectional view taken on line 3—3 of Fig. 2, Figure 4 is a longitudinal sectional view taken on line 4—4 of Fig. 2, Figure 5 is a transverse sectional view taken on line 5—5 of Fig. 1, Figure 6 is a transverse sectional view taken on line 6—6 of Fig. 1.

Figure 8:
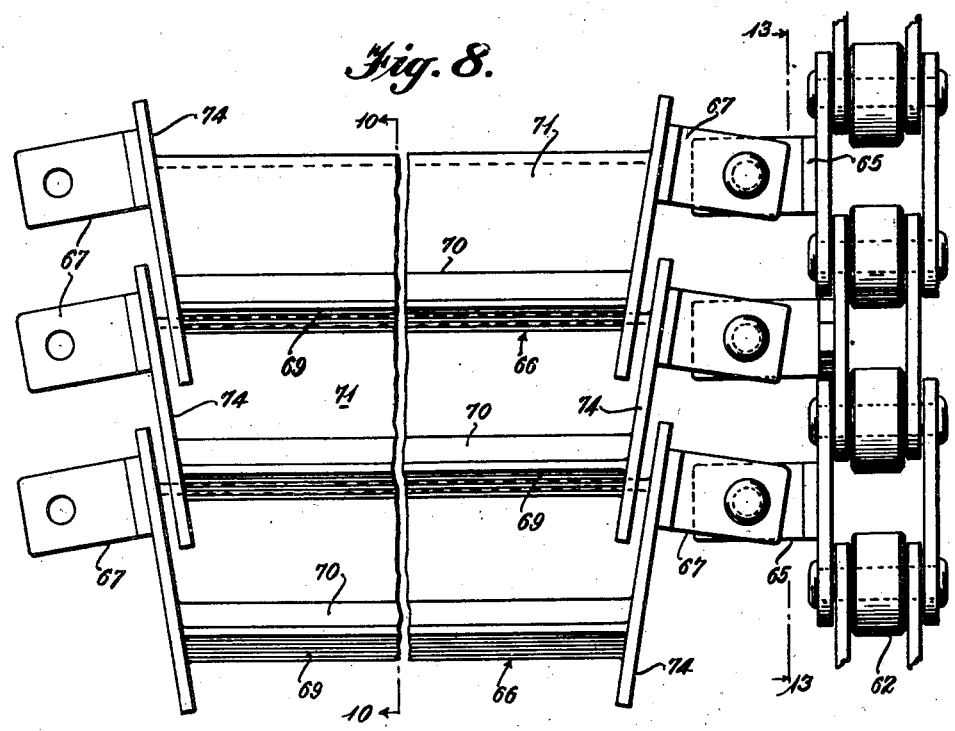
Figure 8 is a fragmentary plan view, partly broken away, of a small section of the conveyor mechanism that is employed as a part of the apparatus shown in the preceding figures.
Figure 9:
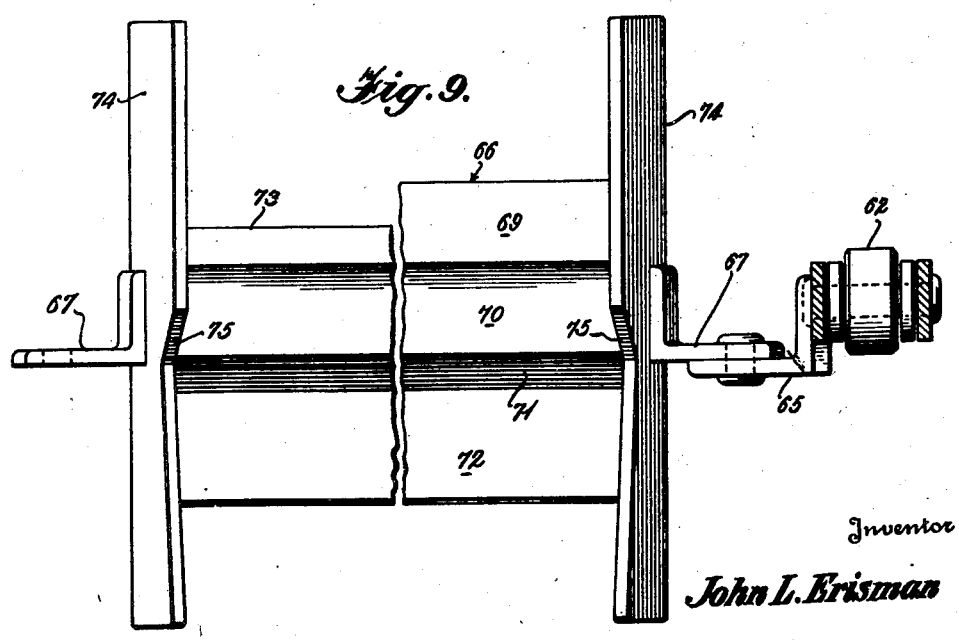
Figure 9 is a detail, elevational view, partly broken away, of one conveyor pan or apron.
Figure 10:
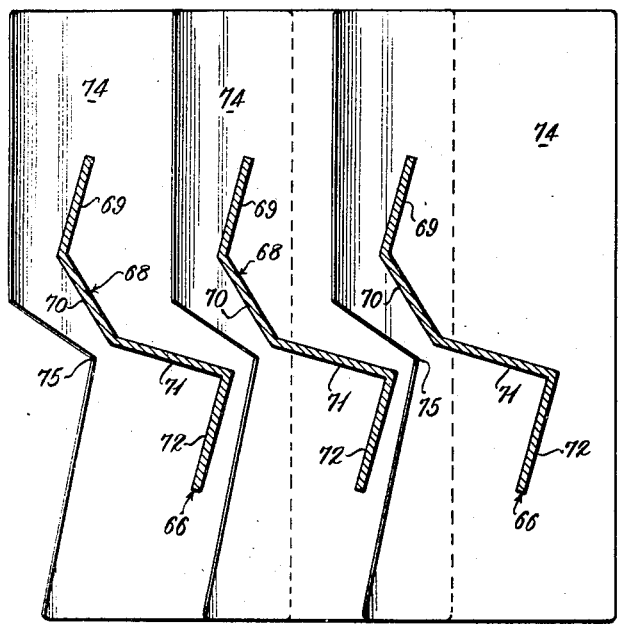
Figure 13:
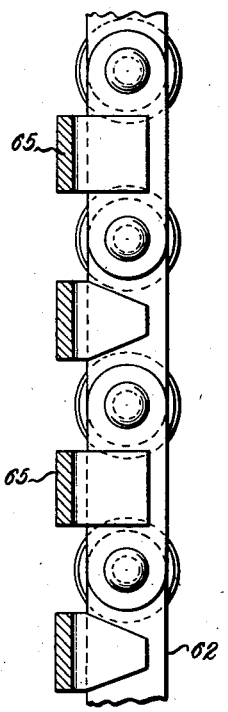
Figure 11:
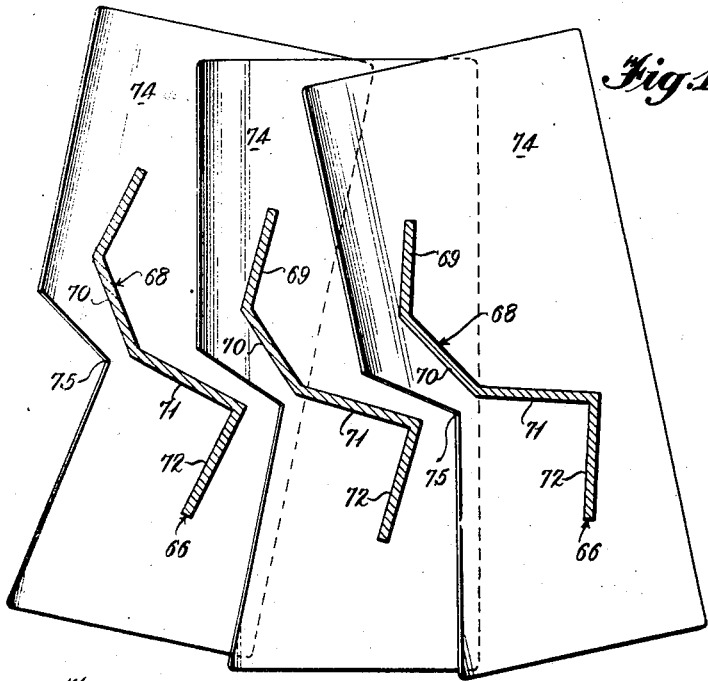
Figure 12:
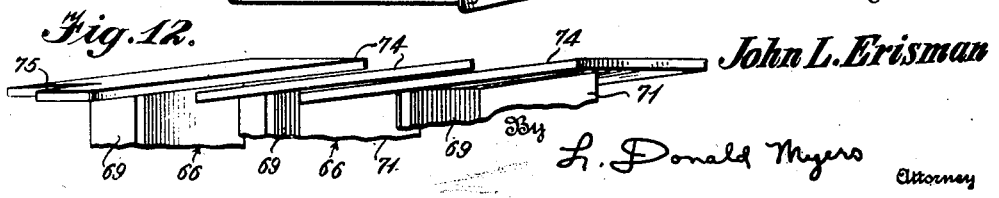

Figure 10 is a vertical sectional view taken on line 10—10 of Fig. 8 and shows the conveyor pans, and their associated end plates, in the relative positions they assume while traveling through a straight run for the conveyor, Figure 11 is a similar view to Fig. 10 but discloses the relative positions assumed by adjacent conveyor pans or aprons, and their end plates, while moving through a curved path, Figure 12 is a fragmentary plan view looking down on the pans or aprons and the end plates of the conveyor members shown in Fig. 11, Figure 13 is a detail sectional view taken on line 13—13 of Fig. 8, Figure 14 is a fragmentary and partly broken away vertical sectional view, taken on line 14—14 of Fig. 15, and is provided to illustrate the manner in which the material is lifted through and is caused to fall or cascade through the flow path of the treatment air, or other gaseous fluid, Figure 14a is a fragmentary vertical sectional view taken on line 14a—14a of Fig. 15, Figure 15 is a fragmentary, vertical sectional view taken at right angles to the showing of Fig. 14 and is provided to illustrate in elevation the movements of the material shown in section in Fig. 14, Figure 16 is a diagrammatic view which is intended to depict the manner in which the flowable solids being treated are caused to make several passes or move through several complete cycles while traveling from the feeding point to the discharging point of the apparatus, Figure 17 is a side elevational view of a slightly modified form of apparatus embodying the invention; and Figure 18 is a vertical sectional view taken through the apparatus of Fig. 17.

In the drawings, wherein for the purpose of illustration are shown the preferred embodiments of this invention, and first particularly referring to Figs. 1 to 4 inclusive, the reference character A is employed for designating in its entirety the housing of this apparatus which is employed for treating flowable solids. This housing is of any suitable fabricated construction. As disclosed in these figures, the housing includes a top frame 20 formed of side and end channel irons and a bottom frame 21 formed of side and end channel irons. The opposite sides of this housing are completed or closed by the wall panels 22 and 23 while the ends are closed or completed by the wall panels 24 and 25.

Figs. 1 to 4 inclusive disclose the side channel irons for the bottom frame 21 as being extended beyond the bottom of the housing A to provide for pivotal connection at 26 with a suitable base frame 27. The side channel irons for the bottom frame 21 are additionally extended beyond the upper end of the housing A to accommodate the rod 28 which is employed for adjustably connecting the side channel irons to the upstanding channel members 29. The lower ends of these channel members 29 are pivotally connected at 30 to the base frame 27. By means of this construction, it will be appreciated that the apparatus housing A may be positioned at any desired number of different inclined angles relative to the vertical. It is expressly pointed out at this time that the specific structural features of the housing A and its supporting frame 27 and channels 29 described above are not intended to limit the invention to this particular construction. It will be appreciated that the housing A can be fabricated in many different ways to satisfy the requirements regarding strength, rigidity and closed or sealed characteristics of the side walls and end walls. Furthermore, the base frame 27 and the upstanding channel members 29, with the pivotal and adjustable connections between the bottom frame 21 and the members 27 and 29 are merely intended to provide a suitable support for the housing A and to illustrate the point that the housing can be supported at any suitable inclined angle with respect to the vertical. In making commercial installations for handling specific materials and for treating these materials in a specific way, the desired inclination of the housing A will be predetermined and a supporting frame structure will be provided for permanently retaining the housing at the proper inclined angle with respect to the perpendicular.

Figure 2:
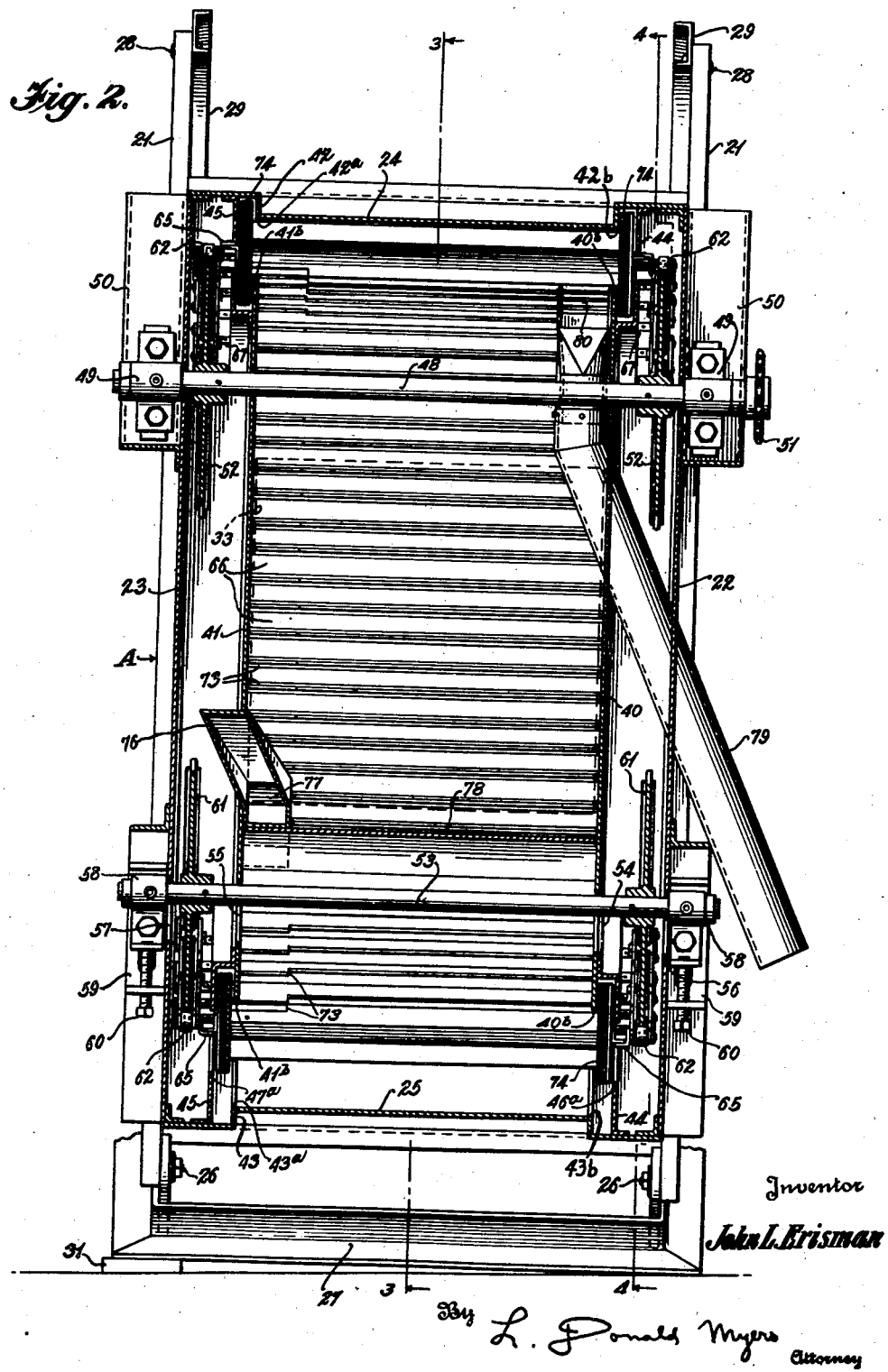

Fig. 2 discloses the entire apparatus as being transversely canted with respect to the horizontal. This condition of the apparatus is illustrated as being obtained by the positioning of a block or shim 31 under one side of the base frame 27. It will be appreciated that blocks or shims of different thickness will maintain the entire apparatus at different canted angles with respect to the horizontal. It is again noted that the illustrated manner of obtaining the transverse canting of the apparatus should not be construed as limiting the invention to this particular construction. The desired degree of canting will be predetermined for each installation and the supporting frame structure for the housing A will be properly constructed to permanently maintain the desired canted angles relative to the horizontal.

Figure 1:
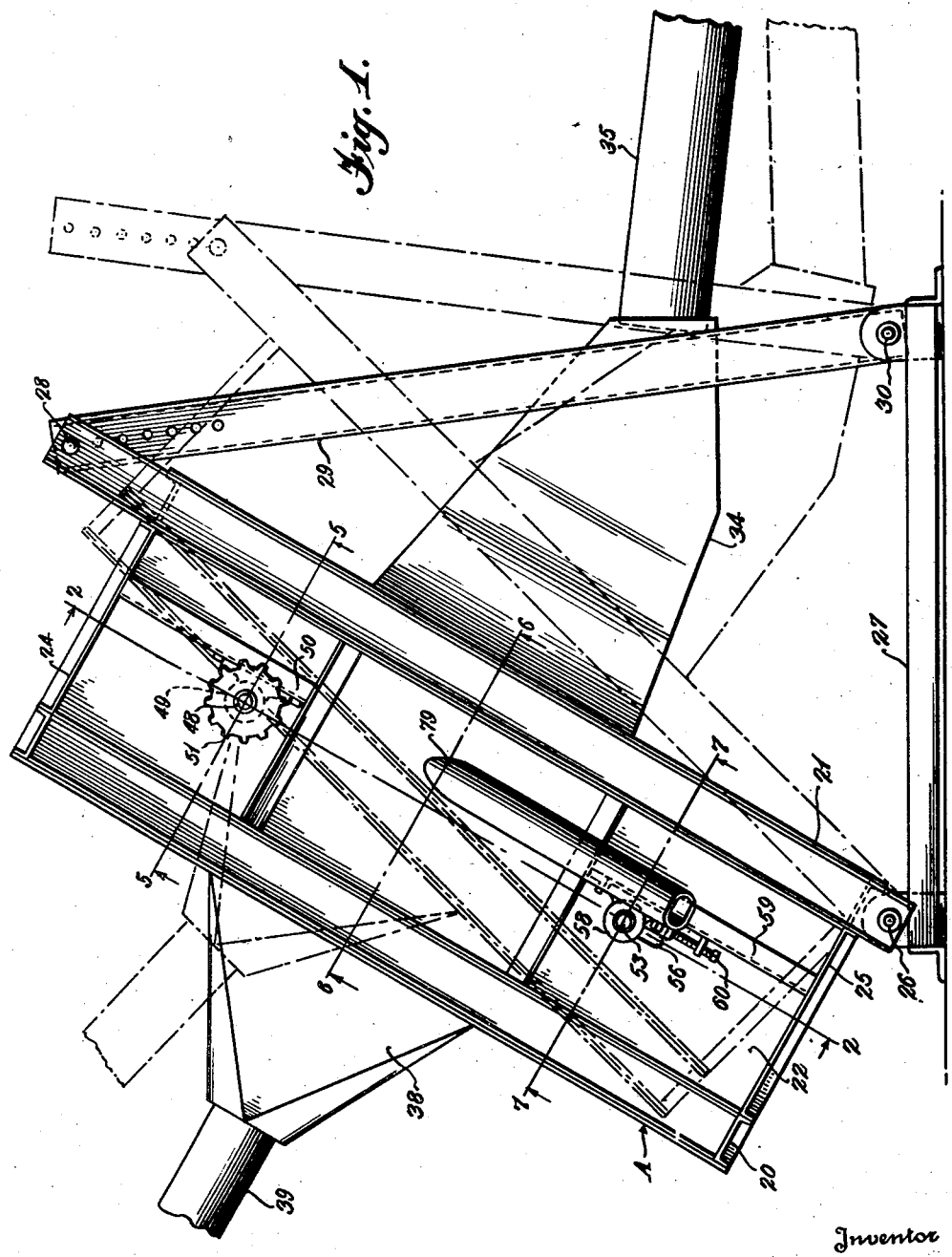

Referring now to Figs. 1 and 3 to 7 inclusive, it will be seen that the bottom of the housing A is provided with a wall panel 32 that is interrupted intermediate its length and throughout a desired portion of its width to provide an inlet opening 33 for the treatment air, or other gaseous fluids. An inlet box 34 is suitably connected to the wall panel 32 at the margins of the inlet opening 33 and functions to deliver the treatment air, or other fluid, to the interior of the housing A. Fig. 1 discloses the inlet box as being suitably connected to a supply duct 35 which, of course, will extend to a suitable source of treatment fluid under the desired pressure head.

These same Figs. 1 and 3 to 7 inclusive disclose the top of the housing A as being provided with a wall panel 36 that is suitably interrupted intermediate its ends and for a desired portion of its width to provide an exhaust opening 37 for the treatment fluid after it has passed through the housing A. A suitable exhaust hood 38 is connected in any desired manner to the top wall panel 36 at the margins of the exhaust opening 37 and functions to carry off the treatment gases and deliver them to an exhaust duct 39.

Figure 3:
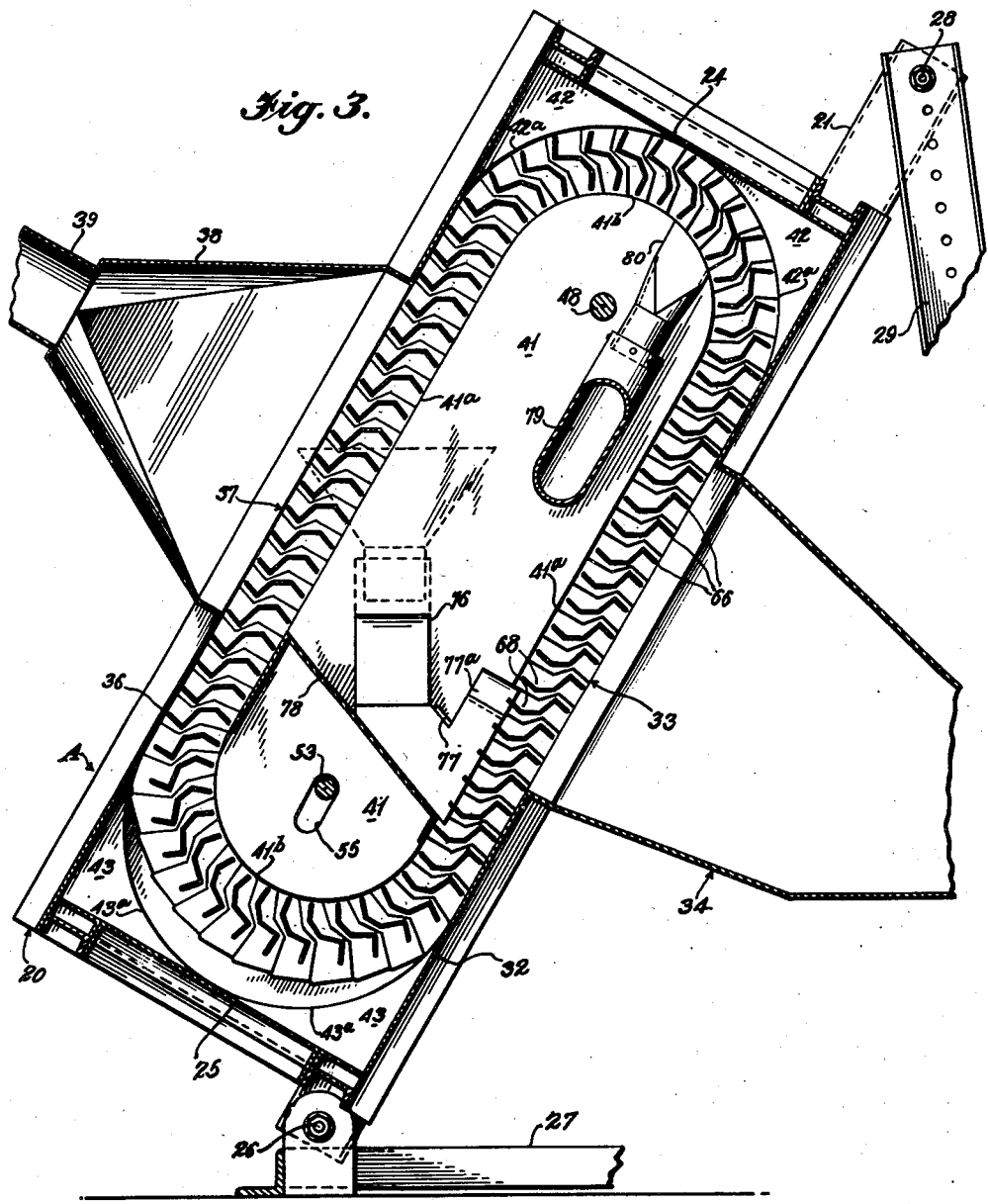

Figs. 2 to 7 inclusive disclose secondary side walls 40 and 41 which are arranged in parallelism with the exterior wall panels 22 and 23 respectively and are spaced inwardly from these panel walls for the purpose of accommodating two strands of conveyor chains, sprocket wheels for the chains, etc., to exclude these elements from the direct path of the treatment fluid. Figs. 3 and 5 to 7 inclusive disclose these secondary side walls as terminating in longitudinal edges 40a and 41a respectively in spaced relation to the bottom panel wall 32 and the top panel wall 36 to allow for the passage of the flights of a conveyor while the flights are moving through parallel paths. Figs. 2 and 3 disclose these secondary side walls 40 and 41 as terminating in arcuate end edges 40b and 41b in spaced relation to the end wall panels 24 and 25 to allow for the passage of the conveyor flights around the head and foot sprocket wheels. Fig. 3 discloses secondary side wall extensions 42 at the upper end of the housing A which lie in the same plane as the secondary side wall 41. The inner arcuate edges 42a are shaped to accommodate the conveyor flights as they move around the head sprocket wheels. This Fig. 2 also discloses secondary side wall extensions 43 which lie in the same plane as the secondary side wall 41. The inner arcuate edges 43a are shaped and arranged to accommodate the conveyor flights while passing around the foot sprocket wheels. In the Fig. 3 disclosure, it will be seen that these arcuate edges 43a are spaced from the conveyor flights in their illustrated paths. This spacing is to allow for adjustments of the foot sprocket wheels to take up stretch or wear that develops in the two strands of conveyor chains. It will be seen, by inspecting Fig. 2, that extensions 42b and 43b, similar to those identified by the reference characters 42 and 43, are provided for the secondary side wall 40.

To assist in sealing the openings or gaps provided outwardly of the edges of the secondary side walls 40 and 41 against the leakage of the treatment fluid, sealing boxes or channels 44 and 45 are formed laterally outwardly of these openings or gaps. Figs. 2 and 4 to 7 inclusive show the box or channel 44 as being associated with the secondary side wall 40 while Figs. 2 and 5 to 7 inclusive disclose the box or channel 45 as being associated with the secondary side wall 41.

Figure 4:
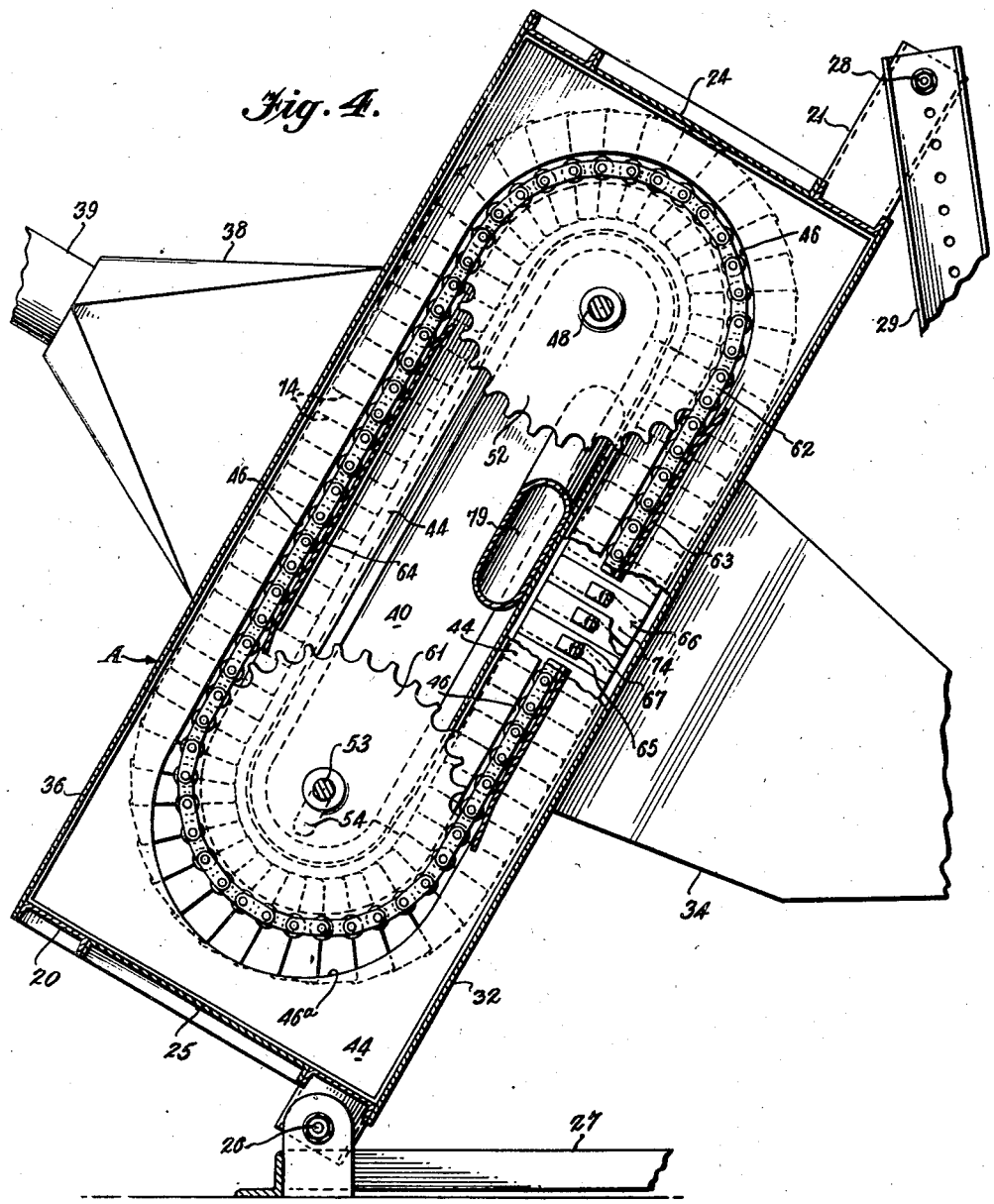

Figs. 2 and 4 to 7 inclusive disclose the box or channel 44 as having a slot 46 formed therein to allow for the passage of attachment lugs carried by the pan or apron flights of the conveyor. Figs. 2 and 4 disclose this slot 46 as being of increased width at its lower end 46a to accommodate take-up adjustments of the foot sprocket wheels.

Figs. 2 and 5 to 7 inclusive disclose the box or channel 45 as having a slot 47 to accommodate the attachment lugs carried by the opposite ends of the conveyor flights. Fig. 2 discloses this slot at its lower end portion 47a as being of increased width like the lower end 46a of slot 46. It will be explained at a later point that the conveyor flights are provided with end sealing plates that travel in these boxes or channels 44 and 45 and help to seal against the leakage of the treatment air, or other gaseous fluid, through the slots 46 and 47 that are formed in the boxes or channels.

Figure 5:
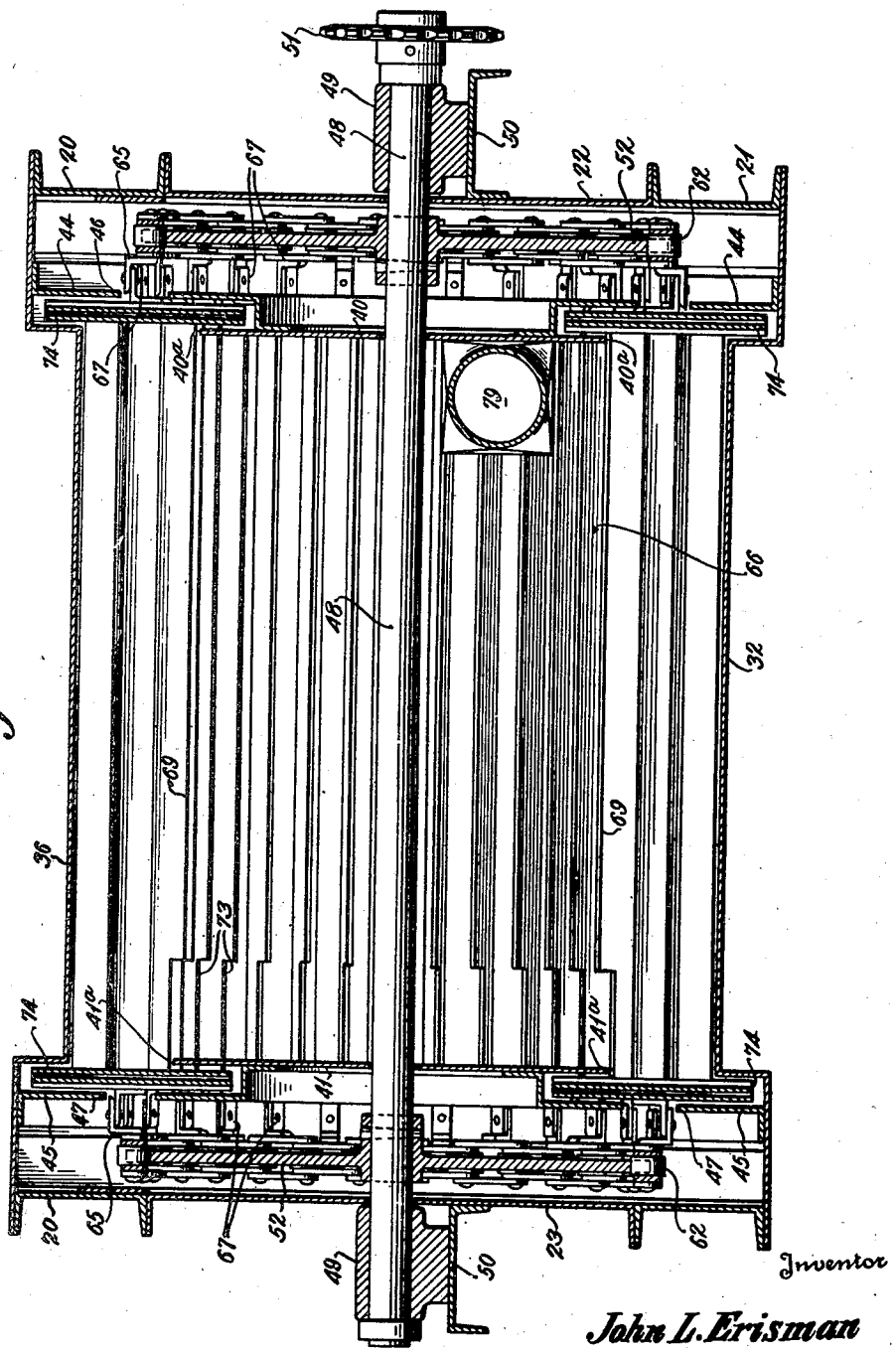

Figs. 1 to 5 inclusive disclose a head shaft 48 as extending transversely through the upper end portion of the housing A. Figs. 2 and 5 show this shaft as extending through suitable openings formed in the secondary side walls 40 and 41 and as extending through suitable openings formed in the side wall panels 22 and 23. Figs. 1, 2 and 5 disclose the outer projecting ends of this head shaft 48 as being journaled in suitable bearings 49 that are located outside of the housing A. These three figures show these bearings 49 as being suitably mounted on supporting brackets 50 that are attached to the opposite side wall panels 22 and 23. A drive sprocket 51 is illustrated as being mounted on one projecting end of the head shaft 48. A suitable prime mover, not shown, is to be drivingly connected to this drive sprocket 51.

Figs. 2, 4 and 5 disclose head sprocket wheels 52 as being mounted on the portions of the head shaft 48 which are arranged within the spaces formed between the side wall panels 22 and 23 and the secondary side walls 40 and 41, respectively.

Figure 7:
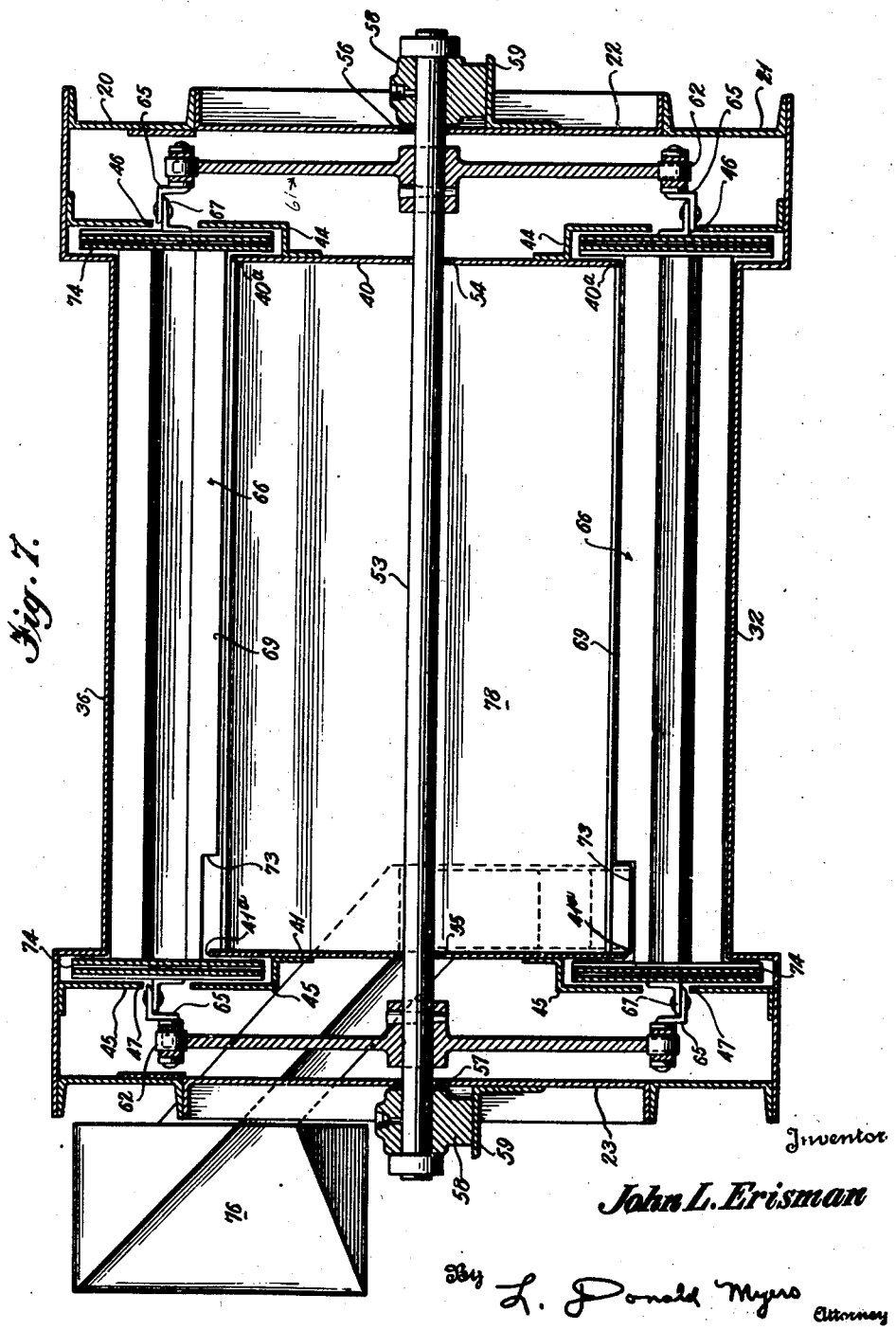
Figure 7 is a transverse sectional view taken on line 7—7 of Fig. 1.

Figs. 1 to 4 inclusive and 7 disclose a foot shaft 53 as extending through the lower end portion of the housing A. Figs. 2, 3, 4 and 7 disclose this foot shaft 53 as passing through elongated openings 54 and 55 that are formed in the secondary side walls 40 and 41 respectively. Figs. 1, 2 and 7 disclose this foot shaft 53 as extending through elongated openings 56 and 57 that are formed in the side wall panels 22 and 23 respectively. These elongated openings 54 to 57 inclusive are provided to accommodate take-up adjustments of this foot shaft 53.

Figs. 1, 2 and 7 disclose the outer end portions of the foot shaft 53 as being mounted in suitable bearings 58 that are suitably, adjustably attached to mounting brackets 59 carried by the side wall panels 22 and 23. Suitable take-up screws 60 are operatively associated with the bearings 58 and the mounting brackets 59 for effecting adjustments of the foot shaft 53 longitudinally of the housing A.

Suitable means are provided in the lower portion of the housing for guiding the conveyor chains, such as the foot sprocket wheels 61 mounted on the portions of the foot shaft 53 which pass through the spaces formed between the outer side wall panels 22 and 23 and the secondary side walls 40 and 41 respectively.

Figure 6:
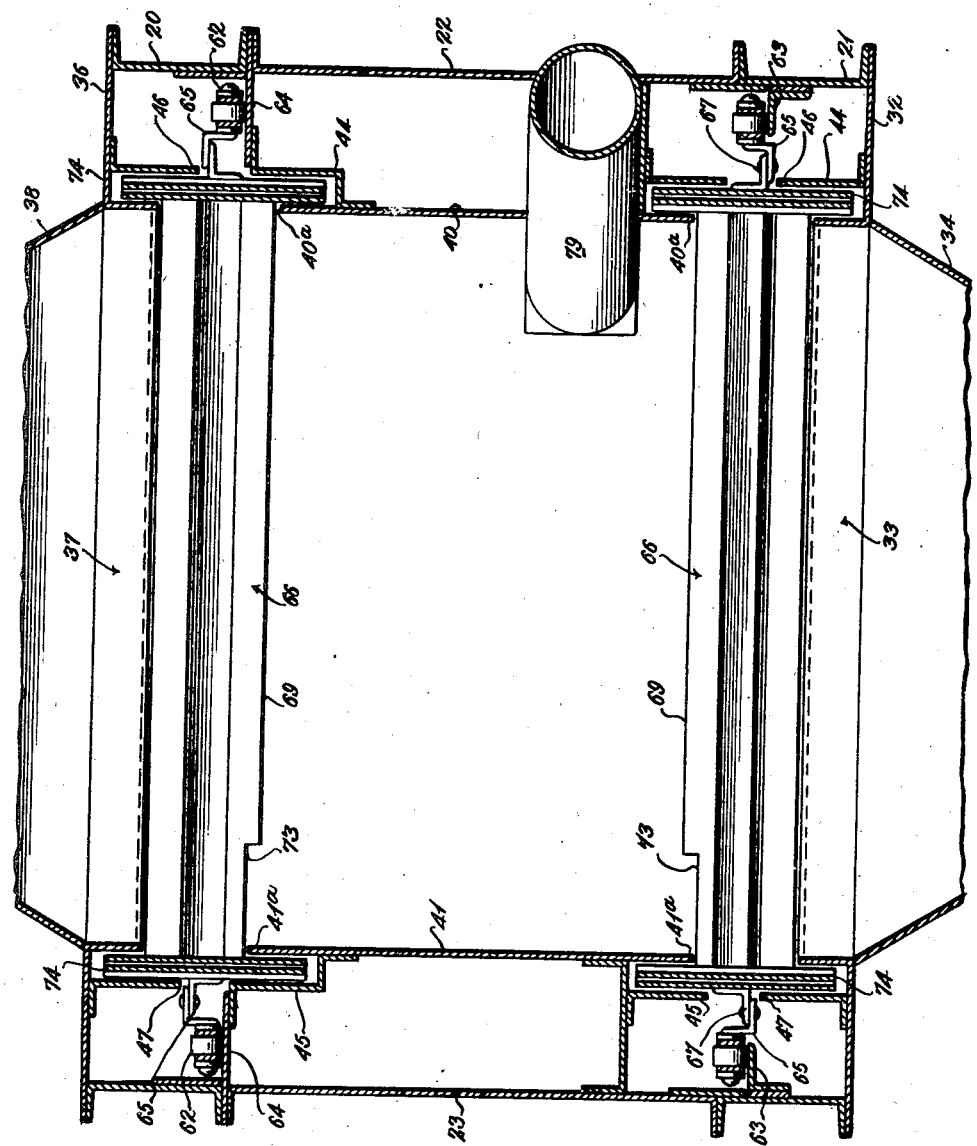

Figs. 2, 4, 5 and 7 disclose a separate strand of roller chain 62 trained over each aligned pair of head and foot sprocket wheels 52 and 61. These chains, of course, are driven by the head shaft 48. Figs. 4 and 6 disclose angle tracks 63 for supporting and guiding the chain strands while passing through the lower run extending between the head and foot wheels. These same figures disclose angle tracks 64 for supporting and guiding the two strands of chain while passing through the upper run extending between the head and foot wheels. A laterally inwardly extending attachment lug 65 is shown in each of Figs. 2, 5 to 9 inclusive, and 13 as being attached to the inner side plate of each link of this roller chain.

These attachment lugs are employed for connecting to the two strands of chain the pan or apron type of flight 66 by means of the attachment lugs 67 that are carried by the opposite ends of the flights. The flights 66 are clearly disclosed in Figs. 2 to 12 inclusive, 14 and 14a while the attachment lugs 67 are shown in Figs. 2 and 4 to 9 inclusive. The particular shape of each one of the pan or apron type of flights 66 is best shown in Figs. 3, 8 to 12 inclusive, 14 and 14a. It will be noted from these several figures that each flight, of course, extends between the two strands of chains 62. Each flight is of multi-angle formation in section. The flights are shaped and arranged within the assembly to provide material carrying pans 68 while traveling upwardly through the lower run of the conveyor. Each one of these pans 68 is formed by the inner lip portion 69, the intermediate bottom or base portion 70, and the back portion 71. An outer lip or flange 72 is provided for the dual purpose of adding strength to the flight and for cooperating with the wall panels 32 and 36 for preventing by-passing of the treatment gases admitted to the housing A through the inlet opening 33 and exhausted from this housing through the outlet opening 37. Figs. 2, 5 to 7 inclusive, 9 and 14 show the inner lip portion 69 of each flight as being notched or cut away at 73, which is at the lefthand end of each flight, to accommodate the feed spout which will be specifically referred to at a later point.

In describing the use of the sealing boxes or channels 44 and 45, it was mentioned that the opposite ends of the flights carried end plates for cooperating with these sealing boxes or channels. These end plates are best shown in Figs. 8 to 12 inclusive and will be specifically described in connection with these disclosures. By particularly considering Figs. 8 and 12, it will be noted that these end plates 74 of adjacent flights 66 overlap each other and this is due to the fact that they are obliquely arranged with respect to the flight pans or main bodies 68. These end sealing plates are of rectangular formation with the exception of being notched out at 75 to accommodate the angular portions 71 and 72 of succeeding flights. Figs. 10 and 11 best illustrate the manner in which these sealing end plates overlap and cooperate with each other while their flights are traveling through a straight path and while they are traveling around a bend produced by the head or foot sprocket wheels. Figs. 2, 4 and 5 to 7 inclusive clearly illustrate the manner in which these end sealing plates 74 travel through and cooperate with the sealing boxes or channels 44 and 45 for preventing leakage of the treatment fluid from the interior of the housing A into the spaces that are formed between the outside wall panels 22 and 23 and the secondary side walls 40 and 41 respectively.

Figs. 2, 3, 7 and 14 best illustrate a material feed chute 76 employed for delivering the flowable solids that are to be treated into the interior of the housing A at a zone which is located at the lefthand side of the path of travel of the flights 66, while they move through their active, lower run, and adjacent the region where the flights move into the straight line path of the lower run after bending around the foot sprocket wheels 61. It was pointed out in describing the conveyor flights 66 that the inner lips 69 thereof were notched out at 73 to accommodate the inner end of this feed spout. Figs. 3 and 14 best disclose the manner in which the inner, delivery end of the feed spout 76 cooperates with the notched out portions 73 of the material lifting pans 68 of the flights as they move into the straight, active, lower run of the conveyor. A trim-off plate 77 and a deflector plate 77a are illustrated in Figs. 14 and 14a as functioning respectively to control the amount of material fed by the spout 76 into the conveying pans 68 and to prevent cascading material from interfering with the feed.

A suitable shield or spill plate 78 is shown in Figs. 2, 3, 7, 14, 14a and 15 as extending the entire distance between the secondary side plates 40 and 41 and just below the delivery zone of the feed spout 76. The manner in which this shield or spill plate 78 functions to prevent the material being treated from spilling down into the path of the flights traveling around the foot sprocket wheels will be more fully explained at a later point.

Figs. 1 to 6 inclusive, 15 and 16 disclose a discharge spout 79 as extending into the interior of the housing A through the side wall panel 22 and the secondary side wall 40 to terminate in the manner best illustrated in Figs. 2 and 3. This terminal end 80 is open and is positioned to receive the fully treated material as it is spilled from the right hand end portions of the flight pans 68 in bending around the head sprocket wheels 52. This spillage of the treated material will be more fully explained at a later point.

It is now believed that a description of the movement of the material to be treated through the housing A is in order and it will be presented in connection with the disclosures of Figs. 14 to 16 inclusive, which have been provided principally for this purpose.

It is believed that a brief explanation of the part or portion of the apparatus that is disclosed in these three figures will be helpful in arriving at a better understanding. By first comparing the sectional view of Fig. 14 with the sectional view of Fig. 3, it will be seen that the flights 66 of the lower active run are shown along with a few of the flights traveling from the lower bend of the conveyor path into the straight lower run and several of the flights as they move around the head sprocket wheels. In other words, the illustrated flights are those that extend from a point just below the feeding zone for the material to a point just beyond the zone of discharge. Schematic and diagrammatic views provided by Figs. 15 and 16 are intended to show in plan the same number of flights as are shown in Fig. 14. Therefore, these figures 15 and 16 show areas bounded by the secondary side plates 40 and 41 at their opposite sides and the feed and discharge spouts 76 and 79 which are located at diametrically opposite corner portions of this area.

These two figures also illustrate the bottom spill or shield plate 78.

It will be remembered that the housing A is intended to be supported in such a manner that the lower, active run of the conveyor is inclined at a desired angle with respect to the perpendicular. Additionally, the housing A is intended to be transversely canted at any desired angle relative to the horizontal. The inclination of the active run of the conveyor is depicted in Fig. 14 while the transverse canting is clearly shown by the disclosures of Figs. 15 and 16.

Starting with the flowable solids to be treated as they are delivered by the feed spout 76 into the pans 68 of the flights as the latter move through the feeding zone, we will see that a band of completely untreated material is applied to the left hand end portion of each flight. This band of material is lifted or elevated in the form of spaced charges or masses through the path of flow of the treatment air, or other gaseous fluid, that is produced by the inlet box 34 and the exhaust hood 38. That is to say, separate masses or charges of the material are lifted through the path of the treatment gases and these gases are permitted to pass through the spaces provided between the adjacent flights 66 with the result that the treatment gases will be placed in contact with the top surfaces of the masses or charges being carried by the flights.

Fig. 14 discloses the completely untreated material B being delivered by the feed spout 76 into the pans 68 of the flights 66 and the individual charges or masses C of the material being lifted through the flow path of the treatment gases, moving in the direction of the arrow D. The upward direction of travel of the conveyor flights in this figure is represented by the arrow E.

Fig. 15 discloses the flights 66 as carrying the separate charges or masses of material C upwardly through the treatment zone. The solid arrow line H in Fig. 16 is intended to represent the upward movement of this first band of material C that is being elevated by the flights 66. The general path of movement of this first band of material is parallel to the secondary side plates 40 and 41 and, of course, it is at an angle to the vertical due to the inclination of the path of the flights and due to the canted condition of the housing A.

Returning now to Fig. 14, it will be seen that as the flight pans 68 travel around the bend provided by the head sprocket wheels 52, the material C will start spilling over the edges of the inner lips 69 of the flight pans. This spilling is identified by the reference character J. The material continues to spill from the flight pans until the angle assumed by the inner lips 69 of the pans is less than the angle of repose of the material C on the flights. This spilled material flows or cascades downwardly over the ascending flights and the charges or masses of material C being lifted by these flights. The downwardly flowing or cascading stream of material is represented by the character K. It will be appreciated that this stream of cascading material is thin or shallow and as it moves or falls through the spaces provided between adjacent flights 66, the treatment fluid will be caused to pass or permeate through the stream with the result that every individual particle or lump of the flowing material is directly subjected to the air, or other gaseous fluid.

Fig. 15 attempts to represent this falling or cascading stream of material by the dotted lines K'. The broken arrow line K$^a$ of Fig. 16 is intended to represent the downward fall of the material that was elevated in the initial band represented by the solid arrow line H. As this falling material is under the influence of gravity, its path will be truly vertical and it will consequently advance to a certain extent transversely across the treatment area, or in the direction of the discharge side of housing A. Of course, some of the material falling from the initial band of elevated material will not clear the zone occupied by the feed spout 76 and this material is illustrated in Figs. 14 and 15 as being deflected laterally of the feed zone by the plate 77a.

All of the falling or cascading material finally will be stopped by the shield or spill plate 78, see Figs. 14a and 15, and will be recharged by this plate into the rising pans 68 of the flights as they are returned empty to this recharging zone. It will be appreciated that the material being treated will be repeatedly lifted by the flights 66 and repeatedly spilled to cascade downwardly over the ascending flights any desired number of times as the material is advanced to the discharge zone. The solid, up arrow lines L and the interrupted, down arrow lines M of Fig. 16 are intended to depict this repeated cycling of the material through the flow path of the treatment gases while advancing transversely of the treatment zone. By varying the degree of cant of the housing A, the material will be caused to make different numbers of passes or complete cycles in advancing through the housing. The number of solid and interrupted arrow lines illustrated in Fig. 16, therefore, are not intended to limit the invention to this particular number of passes or cycles. It further will be understood that subsequent to the initial upward travel of the material delivered by the feed spout 76 as a fairly well defined band, this band formation will completely disappear due to a blending of the material laterally.

As the material is spilled, as at J, from the righthand end portions of the flights as they move around the head sprocket wheels, the spilled material will be received by the upper open end 80 of the discharge spout 79 and will be carried out of the housing for delivery to any desired point.

It will be noted at this point that it is impossible to provide an entirely accurate pictorial showing of the movement of the material upwardly, downwardly and transversely of the treatment zone and for that reason the illustrations provided by Figs. 14 to 16 inclusive must necessarily merely be representative. A really critical inspection of these three disclosures will show instances of exaggeration and other instances where the movements of the material are under-illustrated. However, it is believed that these figures will provide persons skilled in the art with a reasonably comprehensive picture.

It will be appreciated, of course, that by varying the speed of travel of the conveyor flights and by varying the inclined angle of the active lower run of the conveyor, through adjustment of the housing A, the duration of the treatment period provided for the material can be varied considerably. These adjustments plus variations in transverse and longitudinal dimensions of the flight pans 68 as well as variations in the length of the active run of the conveyor will provide any desired variation in the tonnage capacity of this treatment apparatus.

The modified form of material treatment apparatus shown in Figs. 17 and 18 will operate in exactly the same manner as the modification shown by Figs. 1 to 16 inclusive. Therefore, the primary purpose of illustrating this modification is to clearly show that structurally the invention is not limited to the details illustrated in the previous figures.

This modification of Figs. 17 and 18 includes the housing A' which is suitably fabricated to provide the necessary strength of construction and the essential leak-proof characteristics for the treatment air, or other gaseous fluids, passed therethrough.

This housing A' is suitably connected to the bottom frame 81 that is pivotally connected at 82 to the base 63. An upright frame 84 is pivotally connected at 85 to the base 83 and is provided with a longitudinal series of openings 86 to receive a rod or bar 87 that passes through the extensions 88 of the base 81. By locating this bar or rod 87 in different ones of the series of holes 86, the housing A' may be held in different positions to vary the angle of inclination of the active bottom run of the conveyor for the apparatus. A suitable jack 89 is provided to effect adjustments of the pivotally mounted frame 81 of the housing A'.

An inlet box 90 is suitably connected to the underside of the housing A' for delivering the treatment air, or other gaseous fluid to the inlet opening 91 of the housing A'. An exhaust hood 92 is suitably connected to the upper wall of the housing A' and communicates with the exhaust opening 93 that leads from the interior of the housing.

The pan type of flight conveyor 94 is of identical construction to the conveyor shown in the preceding figures. However, the two chain strands are trained over head sprocket wheels 95 while the fixed tracks 96 and adjustable tracks 97 are substituted for the foot sprocket wheels of the previously described modification. These chain guiding and supporting tracks 96 and 97 provide an enlarged loop type of path for the foot of the conveyor. The tracks 97 are adjusted by the take-up mechanism 98 to provide for tightening the two strands of conveyor chains. Fig. 18 discloses a feed spout 99 of the same general construction as the feed spout 76 for the previously described modification. Figs. 17 and 18 disclose a discharge spout 100 which is of substantially the same construction as the previously described discharge spout 79. A shield or spill plate 101 is positioned in the lower loop portion of the conveyor path and functions in the same manner as the shield or spill plate 78 for the previously described modification.

In view of the very detailed manner in which the modification of Figs. 1 to 16 inclusive is illustrated and described, it is believed to be unnecessary to provide any further illustration or description of the modification shown in Figs. 17 and 18. It should be sufficient to say that all other details are the same for both of the embodiments of the invention.

It is to be understood that the forms of this invention herewith shown and described are to be taken as preferred examples of the same, and that various changes in the shape, size, and arrangement of parts, as come within the scope of the subjoined claims, may be resorted to without departing from the spirit of the invention.

Having thus described the invention, I claim:

1. Apparatus of the type described, comprising a housing, a material treatment chamber formed within the housing and including secondary side walls spaced from the side walls of the housing to provide transmission compartments, a head shaft extending through the housing and its treatment chamber, bearings for said shaft mounted outboard of the housing, sprocket wheels mounted on the shaft within said transmission compartments, conveyor chains trained over the sprocket wheels, means in the lower portion of the housing for guiding the conveyor chains, a series of flights arranged to travel a closed path within the treatment chamber, said secondary side walls having slots in alignment with the path of the flights and through which the ends of the flights extend for connection with the links of the conveyor chains, means operatively associated with the flights and the secondary side walls for sealing said slots against the leakage of treatment fluid from said chamber, inlet and outlet openings formed in the opposite housing walls that extend between and are arranged substantially at right angles to said secondary side walls between which a gaseous treatment fluid will flow in passing through the said chamber, means for feeding untreated material to the flights in the chamber, and means for receiving treated material from the flights and discharging it from the housing.

2. Apparatus of the type described, comprising a housing, a material treatment chamber formed within the housing and including secondary side walls spaced from the side walls of the housing to provide transmission compartments, a head shaft extending through the housing and its treatment chamber, bearings for said shaft mounted outboard of the housing, sprocket wheels mounted on the shaft within said transmission compartments, conveyor chains trained over the sprocket wheels, means in the lower portion of the housing for guiding the conveyor chains, a series of flights arranged to travel a closed path within the treatment chamber, said secondary side walls having slots in alignment with the path of the flights and through which the ends of the flights extend for connection with the links of the conveyor chains, sealing boxes overlying the slots in the secondary side walls, overlapping sealing plates carried by the ends of the flights and traveling in the sealing boxes, inlet and outlet openings formed in the opposite housing walls that extend between and are arranged substantially at right angles to said secondary side walls between which gaseous treatment fluid will flow in passing through the said chamber, means for feeding untreated material to the flights in said chamber, and means for receiving treated material from the flights and discharging it from the housing.

3. Apparatus of the type described, comprising a pair of parallel shafts canted with respect to the horizontal and arranged in a plane that is inclined with respect to the vertical, aligned sprocket wheels mounted on the parallel shafts, chains trained over the aligned sprocket wheels, elongated conveyor pans attached at their ends to said chains and opening inwardly of their path of travel so as to spill conveyed material downwardly in a shallow stream over the advancing pans of the lower run in passing around the sprocket wheels of the higher shaft, means for feeding material to the conveyor pans at one end portion of each one of the same as they pass into the lower run of the conveyor, means for stopping the downward travel of the spilled material and recharging it into the pans moving along the lower run to effect repetition of the lifting and spilling of the material, and discharge means for receiving the material as it is spilled from the opposite end portions of the pans after having been advanced along the lengths of the pans by the canted position of the path of the pans and the repeated lifting and spilling of the material.

4. Apparatus of the type described, comprising a pair of parallel shafts canted with respect to the horizontal and arranged in a plane that is inclined with respect to the vertical, aligned sprocket wheels mounted on the parallel shafts, chains trained over the aligned sprocket wheels, elongated conveyor pans attached at their ends to said chains and opening inwardly of their path of travel so as to spill conveyed material downwardly in a shallow stream over the advancing pans of the lower run in passing around the sprocket wheels of the higher shaft, means for feeding material to the conveyor pans at one end portion of each one of the same as they pass into the lower run of the conveyor, a spill plate extending across the inside of the lower run of the conveyor for stopping the downward travel of the spilled material and recharging it into the pans to effect repetition of the lifting and spilling of the material, and discharge means for receiving the material as it is spilled from the opposite end portions of the pans after having been advanced along the lengths of the pans by the canted position of the path of the pans and the repeated lifting and spilling of the material.

5. Apparatus of the type described, comprising a pair of parallel shafts canted with respect to the horizontal and arranged in a plane that is inclined with respect to the vertical, aligned sprocket wheels mounted on the parallel shafts, chains trained over the aligned sprocket wheels, elongated conveyor pans attached at their ends to said chains and opening inwardly of their path of travel so as to spill conveyed material downwardly in a shallow stream over the advancing pans of the lower run in passing around the sprocket wheels of the higher shaft, means for feeding material to the conveyor pans at one end portion of each one of the same as they pass into the lower run of the conveyor, means for stopping the downward travel of the spilled material and recharging it into the pans moving along the lower run to effect repetition of the lifting and spilling of the material, discharge means for receiving the material as it is spilled from the opposite end portions of the pans after having been advanced along the lengths of the pans by the canted position of the path of the pans and the repeated lifting and spilling of the material, a housing for enclosing the path of the conveyor pans, and inlet and outlet means between which a gaseous treatment fluid will flow in passing through the housing.

6. Apparatus of the type described, comprising a flight conveyor traveling a closed path including a longitudinally inclined lower run and a head bend curving above the lower run, the flights of the conveyor comprising long material carrying pans opening inwardly of their path of travel and while traversing the inclined lower run being so overlapped that the inner edge of each pan overlies the material carrying portion of the next succeeding pan and being so closely positioned that a relatively narrow flow path for gaseous treatment fluid is formed between the bottom of each pan and the top of the material carried by the next succeeding pan, the pans being tipped while moving around the head bend to cause the conveyed material to spill onto the uppermost pans in the lower run and cascade downwardly in a shallow stream over the remaining advancing pans and through the treatment fluid flow paths between said advancing pans, means for stopping the downward travel of the cascading material and recharging it into the pans to effect repeated lifting and spilling of the material, a housing enclosing the conveyor, said housing having a treatment fluid inlet opening paralleling the bottom of said inclined lower run and having an area substantially equal in width to the length of said pans and equal in height to a length of said inclined lower run that includes several of said pans, said housing having an exhaust opening for discharging the treatment fluid after it has passed through the flow paths formed between the pans in said lower run and permeated through the stream of material cascading downwardly over said pans, means for feeding untreated material to said pans, and means for receiving treated material from the pans for discharge from the housing.

7. Apparatus of the type described, comprising a flight conveyor traveling a closed path including a longitudinally inclined lower run and a head bend curving above the lower run, the flights of the conveyor comprising long material carrying pans opening inwardly of their path of travel and while traversing the inclined lower run being so overlapped that the inner edge of each pan overlies the material carrying portion of the next succeeding pan and being so closely positioned that a relatively narrow flow path for gaseous treatment fluid is formed between the bottom of each pan and the top of the material carried by the next succeeding pan, the pans being tipped while moving around the head bend to cause the conveyed material to spill onto the uppermost pans in the lower run and cascade downwardly in a shallow stream over the remaining advancing pans and through the treatment fluid flow paths between said pans, means for stopping the downward travel of the cascading material and recharging it into the pans to effect repeated lifting and spilling of the material, a housing enclosing the conveyor, said housing having a treatment fluid inlet opening paralleling the bottom of said inclined lower run and having an area substantially equal in width to the length of said pans and equal in height to a length of said inclined lower run that includes several of said pans, said housing having an exhaust opening for discharging the treatment fluid after it has passed through the flow paths formed between the pans in said lower run and permeated through the stream of material cascading downwardly over said pans, means for feeding untreated material to one portion of each pan as said portion passes into the inclined lower run of the conveyor path, means for receiving the treated material as it is spilled from a portion of each pan to which it has been advanced and discharging it from the housing, and means for advancing the material in gradual stages through the housing in a general direction transversely of the length of the lower run of the conveyor from the location where the untreated material is delivered to the pans by the feeding means to a location that is in longitudinal alignment with the place where the treated material is spilled from the pans into the receiving and discharging means.

8. Apparatus of the type described, comprising a flight conveyor traveling a closed path including a longitudinally inclined lower run and a head bend curving above the lower run, the flights of the conveyor comprising long material carrying pans opening inwardly of their path of travel and while traversing the inclined lower run being so overlapped that the inner edge of each pan overlies the material carrying portion of the next succeeding pan and being so closely positioned that a relatively narrow flow path for gaseous treatment fluid is formed between the bottom of each pan and the top of the material carried by the next succeeding pan, the pans being tipped while moving around the head bend to cause the conveyed material to spill onto the uppermost pans in the lower run and cascade downwardly in a shallow stream over the remaining advancing pans and through the treatment fluid flow paths between said advancing pans, a spill plate extending across the inside of the inclined lower run for stopping the downward travel of the cascading material and recharging it into the pans to effect repeated lifting and spilling of the material, a housing enclosing the conveyor, said housing having a treatment fluid inlet opening paralleling the bottom of said inclined lower run and having an area substantially equal in width to the length of said pans and equal in height to a length of said inclined lower run that includes several of said pans, said housing having an exhaust opening for discharging the treatment fluid after it has passed through the flow paths formed between the pans in said lower run and permeated through the stream of material cascading downwardly over said pans, means for feeding untreated material to said pans, and means for receiving treated material from the pans for discharge from the housing.

9. Apparatus of the type described, comprising a flight conveyor traveling a closed path including a longitudinally inclined lower run and a head bend curving above the lower run, the flights of the conveyor comprising long material carrying pans opening inwardly of their path of travel and while traversing the inclined lower run being so overlapped that the inner edge of each pan overlies the material carrying portion of the next succeeding pan and being so closely positioned that a relatively narrow flow path for gaseous treatment fluid is formed between the bottom of each pan and the top of the material carried by the next succeeding pan, the pans being tipped while moving around the head bend to cause the conveyed material to spill onto the uppermost pans in the lower run and cascade downwardly in a shallow stream over the remaining advancing pans and through the treatment fluid flow paths between said advancing pans, means for stopping the downward travel of the cascading material and recharging it into the pans to effect repeated lifting and spilling of the material, a housing enclosing the conveyor and having a wall closely paralleling the bottom of said inclined lower run and formed with a treatment fluid inlet opening having an area substantially equal in width to the length of said pans and equal in height to a length of said inclined lower run that includes several of said pans, means carried by each pan for cooperating with said housing wall to retard by-passing of the treatment fluid above and below the inlet opening, said housing having an exhaust opening for discharging the treatment fluid after it has passed through the flow paths formed between the pans in said lower run and permeated through the stream of material cascading downwardly over said pans, means for feeding untreated material to said pans, and means for receiving treated material from the pans for discharge from the housing.

10. Apparatus of the type described, comprising a flight conveyor traveling a closed path including a longitudinally inclined lower run and a head bend curving above the lower run, the flights of the conveyor comprising long material carrying pans opening inwardly of their path of travel and while traversing the inclined lower run being so overlapped that the inner edge of each pan overlies the material carrying portion of the next succeeding pan and being so closely positioned that a relatively narrow flow path for gaseous treatment fluid is formed between the bottom of each pan and the top of the material carried by the next succeeding pan, the pans being tipped while moving around the head bend to cause the conveyed material to spill onto the uppermost pans in the lower run and cascade downwardly in a shallow stream over the remaining advancing pans and through the treatment fluid flow paths between said advancing pans, means for stopping the downward travel of the cascading material and recharging it into the pans to effect repeated lifting and spilling of the material, a housing enclosing the conveyor and having a wall closely paralleling the bottom of said inclined lower run and formed with a treatment fluid inlet opening having an area substantially equal in width to the length of said pans and equal in height to a length of said inclined lower run that includes several of said pans, said housing having an exhaust opening for discharging the treatment fluid after it has passed through the flow paths formed between the pans in said lower run and permeated through the stream of material cascading downwardly over said pans, means carried by each pan for cooperating with said housing wall to retard bypassing of the treatment fluid above and below the inlet opening, means for feeding untreated material to one portion of each pan as said portion passes into the inclined lower run of the conveyor path, means for receiving the treated material as it is spilled from a portion of each pan to which it has been advanced and discharging it from the housing, and means for advancing the material in gradual stages through the housing in a general direction transversely of the length of the lower run of the conveyor from the location where the untreated material is delivered to the pans by the feeding means to a location that is in longitudinal alignment with the place where the treated material is spilled from the pans into the receiving and discharging means.

11. Apparatus of the type described, comprising a housing, inlet and exhaust means for the housing between which a gaseous treatment fluid will flow in passing through the housing, means for feeding the flowable solids to be treated into the housing, means for discharging the treated solids from the housing, and an endless, spaced flight conveyor having a longitudinally inclined active lower run and an inactive upper run arranged within the housing and transversely canted for advancing the flowable solids through the housing, the active lower run of the conveyor being arranged adjacent to said inlet means, said conveyor having the path of travel of its flights through the inclined active run and from the latter run to the inactive run so arranged that while advancing said solids they will repeatedly elevate the solids through the flow of gaseous treatment fluid and will repeatedly spill the elevated solids in a shallow stream down over the elevating flights to subject the solids in the stream to the action of the gaseous treatment fluid.

12. Apparatus of the type described, comprising a housing having inlet and exhaust openings formed in opposite walls thereof between which a gaseous treatment fluid will flow in passing through the housing, a spaced flight conveyor traveling a closed path within the housing, said conveyor including a longitudinally inclined active lower run passing through the flow path of the treatment fluid adjacent the inlet opening and a head bend curving above the lower run, the flights of the conveyor comprising long pans opening inwardly of their path of travel and adapted to spill conveyed material in a shallow stream downwardly over the flights of the inclined active run in passing around the head bend of the conveyor path, means for feeding the material to be treated to the flight pans at one portion of each one of the same as they pass into the inclined active run of the conveyor for elevation through the treatment fluid, means for receiving the treated material as it is spilled from a different portion of the flight pans and discharging it from the housing, and means for canting the inclined active run of the conveyor lengthwise of the flight pans to cause the material to be advanced along the lengths of the pans as a result of it being repeatedly lifted and spilled by the action of the conveyor.

13. Apparatus of the type described, comprising a housing having inlet and exhaust openings formed in opposite walls thereof between which a gaseous treatment fluid will flow in passing through the housing, a spaced flight conveyor traveling a closed path within the housing, said conveyor including a longitudinally inclined active lower run passing through the flow path of the treatment fluid adjacent the inlet opening and a head bend curving above the lower run, the flights of the conveyor comprising long pans opening inwardly of their path of travel and adapted to spill conveyed material in a shallow stream downwardly over the flights of the inclined active run in passing around the head bend of the conveyor path, means for feeding the material to be treated to the flight pans at one end portion of each one of the same as they pass into the inclined active run of the conveyor for elevation through the treatment fluid, means for receiving the treated material as it is spilled from the opposite ends of the flight pans and discharging it from the housing, means located adjacent the lower end of the inclined active run for stopping the downward travel of the spilled material and recharging it into the flights to effect repetition of the lifting and spilling action of the conveyor, and means for canting the inclined active run of the conveyor to cause it to travel a transversely canted path to effect advancing of the material lengthwise of the flight pans as it is repeatedly lifted and spilled.

14. Apparatus of the type described, comprising a housing having inlet and exhaust openings formed in opposite walls thereof between which a gaseous treatment fluid will flow in passing through the housing, a spaced flight conveyor traveling a closed path within the housing, said conveyor including a longitudinally inclined active lower run passing through the flow path of the treatment fluid adjacent the inlet opening and a head bent curving above the lower run, the flights of the conveyor comprising long pans opening inwardly of their path of travel and adapted to spill conveyed material in a shallow stream downwardly over the flights of the inclined active run in passing around the head bend of the conveyor path, means for feeding the material to be treated to the flight pans at one end portion of each one of the same as they pass into the inclined active run of the conveyor for elevation through the treatment fluid, means for receiving the treated material as it is spilled from the opposite end portions of the flight pans and discharging it from the housing, a spill plate extending across the inside of the inclined active run of the conveyor substantially in transverse alignment with the feeding means for stopping the downward travel of the spilled material and recharging it into the flights to effect repetition of the lifting and spilling action of the conveyor, and means for advancing the material in gradual stages through the housing in a general direction transversely of the length of the lower run of the conveyor from the location where the untreated material is delivered to the pans by the feeding means to a location that is in longitudinal alignment with the place where the treated material is spilled from the pans into the receiving and discharging means.

15. Apparatus of the type described, comprising a housing having inlet and exhaust openings formed in opposite walls thereof between which a gaseous treatment fluid will flow in passing through the housing, a spaced flight conveyor traveling a closed path within the housing, said conveyor including a longitudinally inclined active lower run passing through the flow path of the treatment fluid adjacent the inlet opening and a head bend curving above the lower run, the flights of the conveyor comprising long pans opening inwardly of their path of travel and adapted to spill conveyed material in a shallow stream downwardly over the flights of the inclined active run in passing around the head bend of the conveyor path, means for feeding the material to be treated to the flight pans at one portion of each one of the same as they pass into the inclined active run of the conveyor for elevation through the treatment fluid, means for receiving the treated material as it is spilled from a different portion of the flight pans and discharging it from the housing, a spill plate extending across the inside of the active run of the conveyor substantially in transverse alignment with the feeding means for stopping the downward travel of the spilled material and recharging it into the flights to effect repetition of the lifting and spilling action of the conveyor, and means for canting the inclined active run of the conveyor to cause it to travel a transversely canted path to effect advancing of the material lengthwise of the flight pans as it is repeatedly lifted and spilled.

16. Apparatus of the type described, comprising a housing; a material treatment chamber formed within the housing and including secondary side walls spaced from the side walls of the housing to provide transmission compartments, a head shaft extending through the housing and its treatment chamber, bearings for said shaft mounted outboard of the housing, sprocket wheels mounted on the shaft within said transmission compartments, conveyor chains trained over the sprocket wheels, means in the lower portion of the housing for guiding the conveyor chains, a series of spaced flights arranged to travel a closed path, including a longitudinally inclined active run and an upwardly curving head bend, within the treatment chamber, said secondary side walls having slots in alignment with the path of the flights and through which the ends of the flights extend for connection with the links of the conveyor chains, means operatively associated with the flights and the secondary side walls for sealing said slots against the leakage of treatment fluid from said chamber, inlet and outlet means between which gaseous treatment fluid will flow in passing through the said chamber, the inclined active run of the conveyor being arranged adjacent and at right angles to said inlet means, means for feeding untreated material to the flights in said chamber, means for receiving treated material from the flights and discharging it from the housing, and said conveyor flights being so arranged while traversing said active run and head bend that they will successively lift and spill the flowable solids several times at right angles to and through the flow of gaseous treatment fluid while the material is in the treatment chamber.

17. Apparatus for the type described, comprising a housing, a material treatment chamber formed within the housing and including secondary side walls spaced from the side walls of the housing to provide transmission compartments, a head shaft extending through the housing and its treatment chamber, bearings for said shaft mounted outboard of the housing, sprocket wheels mounted on the shaft within said transmission compartments, conveyor chains trained over the sprocket wheels, means in the lower portion of the housing for guiding the conveyor chains, a series of spaced flights arranged to travel a closed path, including a longitudinally inclined active run and an upwardly curved head bend, within the treatment chamber, said secondary side walls having slots in alignment with the path of the flights and through which the ends of the flights extend for connection with the links of the conveyor chains, sealing boxes overlying the slots in the secondary side walls, overlapping sealing plates carried by the ends of the flights and traveling in the sealing boxes, inlet and outlet means between which gaseous treatment fluid will flow in passing through the said chamber, the inclined active run of the conveyor being arranged adjacent and at right angles to said inlet means, means for feeding untreated material to the flights in said chamber, and means for receiving the treated material from the flights for discharge from the housing, said conveyor flights being so arranged while traversing said active run and head bend that they will successively lift and spill the material several times through the flow of gaseous treatment fluid while the material is in the chamber.

18. Apparatus of the type described, comprising a housing, a material treatment chamber formed within the housing and including secondary side walls spaced from the side walls of the housing to provide transmission compartments, a head shaft extending through the housing and its treatment chamber, bearings for said shaft mounted outboard of the housing, sprocket wheels mounted on the shaft within said transmission compartments, conveyor chains trained over the sprocket wheels, means in the lower portion of the housing for guiding the conveyor chains, a series of spaced flights arranged to travel a closed path, including a longitudinally inclined active run and an upwardly curved head bend, within the treatment chamber, said secondary side walls having slots in alignment with the path of the flights and through which the ends of the flights extend for connection with the links of the conveyor chains, means operatively associated with the flights and the secondary side walls for sealing said slots against the leakage of treatment fluid from said chamber, inlet and outlet means between which gaseous treatment fluid will flow in passing through the chamber, the inclined active run of the conveyor being arranged adjacent and at right angles to said inlet means, means for feeding untreated material to the flights in said chamber, and means for receiving treated material from the flights and discharging it from the housing, said conveyor flights being so arranged while traversing said active run and head bend that they will repeatedly elevate the material through the gaseous treatment fluid entering the housing through the inlet means and will repeatedly spill the elevated solids in a shallow stream down over the elevating flights to subject the material in the stream to the gaseous treatment fluid passing between the elevating flights and their loads.

19. Apparatus of the type described, comprising a housing, a material treatment chamber formed within the housing and including secondary side walls spaced from the side walls of the housing to provide transmission compartments, a head shaft extending through the housing and its treatment chamber, bearings for said shaft mounted outboard of the housing, sprocket wheels mounted on the shaft within said transmission compartments, conveyor chains trained over the sprocket wheels, means in the lower portion of the housing for guiding the conveyor chains, a series of spaced flights arranged to travel a closed path, including a longitudinally inclined active run and an upwardly curved head bend, within the treatment chamber, said secondary side walls having slots in alignment with the path of the flights and through which the ends of the flights extend for connection with the links of the conveyor chains, sealing boxes overlying the slots in the secondary side walls, overlapping sealing plates carried by the ends of the flights and traveling in the sealing boxes, inlet and outlet means between which gaseous treatment fluid will flow in passing through the said chamber, the inclined active run of the conveyor being arranged adjacent and at right angles to said inlet means, means for feeding the untreated material to the flights in said chamber, and means for receiving treated material from the flights and discharging it from the housing, said conveyor flights being so arranged while traversing said active run and head bend that they will repeatedly elevate the material through the gaseous treatment fluid entering the housing through the inlet means and will repeatedly spill the elevated material in a shallow stream down over the elevating flights to subject the material in the stream to the gaseous treatment fluid passing between the elevating flights and their loads.

20. Apparatus of the type described, comprising a housing, a material treatment chamber formed within the housing and including secondary side walls spaced from the side walls of the housing to provide transmission compartments, a head shaft extending through the housing and its treatment chamber, bearings for said shaft mounted outboard of the housing, sprocket wheels mounted on the shaft within said transmission compartments, conveyor chains trained over the sprocket wheels, means in the lower portion of the housing for guiding the conveyor chains, a series of spaced flights arranged to travel a closed path, including a longitudinally inclined active run and an upwardly curved head bend, within the treatment chamber, said secondary side walls having slots in alignment with the path of the flights and through which the ends of the flights extend for connection with the links of the conveyor chains, means operatively associated with the flights and the secondary side walls for sealing said slots against the leakage of treatment fluid from the chamber, inlet and outet means between which gaseous treatment fluid will flow in passing through the said chamber, the inclined active run of the conveyor being arranged adjacent and at right angles to said inlet means, the flights of the conveyor comprising long pans opening inwardly of their path of travel and adapted to spill conveyed material downwardly over the flights of the active run in passing around the head bend of the conveyor path, means for feeding the material to be treated to the flight pans at one end portion of each one of the same as they pass into the active run of the conveyor for elevation through the treatment fluid, means for receiving the treated material as it is spilled from the opposite end portions of the flight pans and discharging it from the housing, and means for advancing the material in gradual stages through the housing in a general direction transversely of the length of the lower run of the conveyor from the location where the untreated material is delivered to the pans by the feeding means to a location that is in longitudinal alignment with the place where the treated material is spilled from the pans into the receiving and discharging means.

21. Apparatus of the type described, comprising a housing, a material treatment chamber formed within the housing and including secondary side walls spaced from the side walls of the housing to provide transmission compartments, a head shaft extending through the housing and its treatment chamber, bearings for said shaft mounted outboard of the housing, sprocket wheels mounted on the shaft within said transmission compartments, conveyor chains trained over the sprocket wheels, means in the lower portion of the housing for guiding the conveyor chains, a series of spaced flights arranged to travel a closed path, including a longitudinally inclined active run and an upwardly curved head bend, within the treatment chamber, said secondary side walls having slots in alignment with the path of the flights and through which the ends of the flights extend for connection with the links of the conveyor chains, sealing boxes overlying the slots in the secondary side walls, overlapping sealing plates carried by the ends of the flights and traveling in the sealing boxes, inlet and outlet means between which gaseous treatment fluid will flow in passing through the said chamber, the inclined active run of the conveyor being arranged adjacent and at right angles to said inlet means, the flights of the conveyor comprising long pans opening inwardly of their path of travel and adapted to spill conveyed material downwardly over the flights of the active run in passing around the head bend of the conveyor path, means for feeding the material to be treated to the flight pans at one end portion of each one of the same as they pass into the active run of the conveyor for elevation through the treatment fluid, means for receiving the treated material as it is spilled from the opposite end portions of the flight pans and discharging it from the housing, and means for advancing the material in gradual stages through the housing in a general direction transversely of the length of the lower run of the conveyor from the location where the untreated material is delivered to the pans by the feeding means to a location that is in longitudinal alignment with the place where the treated material is spilled from the pans into the receiving and discharging means.

22. Apparatus of the type described, comprising a housing having an inclined bottom wall formed with a large treatment fluid inlet opening, a head shaft in one end portion of the housing and arranged in parallelism with said bottom wall, spaced sprocket wheels mounted on said head shaft, guiding tracks positioned in the other end portion of the housing in alignment with said sprocket wheels for cooperating with the latter to define closed, parallel paths for two conveyor chains and to arrange portions of said paths in close parallelism with the inclined bottom wall of the housing, a pair of conveyor chains trained over the sprocket wheels and the guiding tracks, an endless series of spaced conveyor pans connected at their ends to the conveyor chains and arranged to open inwardly of their path of travel and to be tipped while moving around the head sprocket wheels to cause the material that has been conveyed upwardly by the loaded pans moving in close parallelism with the inclined bottom wall of the housing to be spilled downwardly onto those of the loaded pans that are approaching said head sprocket wheels, said housing having an exhaust opening through which the treatment fluid leaves the housing after passing between the spaced, loaded conveyor pans traveling past the inlet opening, means for feeding flowable solids to be treated into the housing, and means for discharging treated solids from the housing.

23. Apparatus of the type described, comprising a housing having an inclined bottom wall formed with a large treatment fluid inlet opening, a head shaft journaled in one end portion of the housing and arranged in parallelism with said bottom wall, spaced sprocket wheels mounted on said head shaft, guiding tracks positioned in the other end portion of the housing in alignment with said sprocket wheels for cooperating with the latter to define closed, parallel paths for conveyor chains and to arrange portions of said paths in close parallelism with the inclined bottom wall of the housing, a pair of conveyor chains trained over the sprocket wheels and the guiding tracks, an endless series of spaced conveyor pans connected at their ends to the conveyor chains and arranged to open inwardly of their path of travel and to be tipped while moving around the head sprocket wheels to cause material that has been conveyed upwardly by the loaded pans moving in close parallelism with the inclined bottom wall of the housing to be spilled downwardly onto those of the loaded pans that are approaching said head sprocket wheels so that the thus spilled material will cascade downwardly in a shallow stream over the remaining loaded pans, means for stopping the downward travel of the cascading material and recharging it into the unloaded pans after they have moved around the bend defined by said guiding tracks, said housing having an exhaust opening through which the treatment fluid leaves the housing after passing between the spaced, loaded conveyor pans traveling past the inlet opening, means for feeding flowable solids to be treated into the housing, and means for discharging treated solids from the housing.

24. Apparatus of the type described, comprising a housing having an inclined bottom wall formed with a large treatment fluid inlet opening, a head shaft journaled in one end portion of the housing and arranged in parallelism with said bottom wall, spaced sprocket wheels mounted on said head shaft, guiding tracks positioned in the other end portion of the housing in alignment with said sprocket wheels for co-operating with the latter to define closed, parallel paths for conveyor chains and to arrange portions of said paths in close parallelism with the inclined bottom wall of the housing, a pair of conveyor chains trained over the sprocket wheels and the guiding tracks, an endless series of spaced conveyor pans connected at their ends to the conveyor chains and arranged to open inwardly of their path of travel and to be tipped while moving around the head sprocket wheels to cause material that has been conveyed upwardly by the loaded pans moving in close parallelism with the inclined bottom wall of the housing to be spilled downwardly onto those of the loaded pans that are approaching said head sprocket wheels so that the thus spilled material will cascade downwardly in a shallow stream over the remaining loaded pans, a spill plate extending across the inside of the path of travel of the conveyor pans for stopping the downward travel of the cascading material and recharging it into the unloaded pans after they have moved around the bend defined by said guiding tracks, said housing having an exhaust opening through which the treatment fluid leaves the housing after passing between the spaced, loaded conveyor pans traveling past the inlet opening, means for feeding flowable solids to be treated into the housing, and means for discharging treated solids from the housing.

25. Apparatus of the type described, omprising a housing having an inclined bottom wall, an inlet box communicating with the interior of the housing through said bottom wall, an exhaust hood communicating with the interior of the housing through a different wall so that a gaseous treatment fluid will pass through the housing in flowing between said box and hood, means for feeding flowable solids to be treated into the housing, means for discharging treated solids from the housing, and an endless conveyor, formed of spaced inwardly opening pans, having its active lower run arranged in close parallelism with the inclined bottom wall of the housing so that the pans in traveling upwardly through the active lower run will pass over the communication opening between the inlet box and the housing, said conveyor having the path of travel of its flight so arranged that the flights moving through the active lower run will repeatedly elevate the solids through the flow path of the gaseous treatment fluid entering the housing from the inlet box and will repeatedly spill the elevated solids in bending away from the upper end of the active run to cascade the spilled material in a shallow stream down over the elevating flights to subject the cascading material to the gaseous treatment fluid passing through the spaces betwen the elevating flights and their loads.

JOHN L. ERISMAN.

REFERENCES CITED

The following references are of record in the file of this patent:

UNITED STATES PATENTS

| Number | Name | Date |
| --- | --- | --- |
| 707,384 | Burner | Aug. 19, 1902 |
| 1,383,798 | Gase | July 5, 1921 |
| 1,880,284 | Schenk | Oct. 4, 1932 |
| 948,751 | Whitlatch | Feb. 8, 1910 |
| 2,336,698 | Morrill | Dec. 14, 1943 |
| 2,062,025 | Harrington | Nov. 24, 1936 |
| 2,073,669 | Zademach | Mar. 16, 1937 |
| 2,125,382 | Lykken et al. | Aug. 2, 1938 |

FOREIGN PATENTS

| Number | Country | Date |
| --- | --- | --- |
| 537,678 | France | May 27, 1922 |
| 615,183 | France | Dec. 31, 1926 |